(12) United States Patent  
Chopra et al.

(10) Patent No.: US 7,280,266 B1
(45) Date of Patent: *Oct. 9, 2007

(54) ELECTROPHORETIC DISPLAY MEDIUM AND DEVICE

(75) Inventors: Naveen Chopra, Oakville (CA); Valerie M. Farrugia, Oakville (CA); Man-Chung Tam, Mississauga (CA); San-Ming Yang, Mississauga (CA); Peter M. Kazmaier, Mississauga (CA); Paul F. Smith, Oakville (CA); Barkev Keoshkerian, Thornhill (CA)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/419,436

(22) Filed: May 19, 2006

(51) Int. Cl.
G02B 26/00 (2006.01)
(52) U.S. Cl. .................. 359/296; 430/32; 204/450; 204/456
(58) Field of Classification Search ............... 359/296; 430/32–38; 204/450, 456
See application file for complete search history.

(56) References Cited

U.S. PATENT DOCUMENTS

| | | |
|---|---|---|
| 2,800,457 A | 7/1957 | Green et al. |
| 3,668,106 A | 6/1972 | Ota |
| 4,272,596 A | 6/1981 | Harbour et al. |
| 5,278,020 A | 1/1994 | Grushkin et al. |
| 5,290,654 A | 3/1994 | Sacripante et al. |
| 5,308,734 A | 5/1994 | Sacripante et al. |
| 5,322,912 A | 6/1994 | Georges et al. |
| 5,344,738 A | 9/1994 | Kmiecik-Lawrynowicz et al. |
| 5,346,797 A | 9/1994 | Kmiecik-Lawrynowicz et al. |
| 5,364,729 A | 11/1994 | Kmiecik-Lawrynowicz et al. |
| 5,370,963 A | 12/1994 | Patel et al. |
| 5,418,108 A | 5/1995 | Kmiecik-Lawrynowicz et al. |
| 5,593,807 A | 1/1997 | Sacripante et al. |
| 6,017,584 A | 1/2000 | Albert et al. |
| 6,113,810 A | 9/2000 | Hou et al. |
| 6,130,774 A | 10/2000 | Albert et al. |
| 6,172,798 B1 | 1/2001 | Albert et al. |
| 6,387,581 B1 | 5/2002 | Moffat et al. |
| 6,395,445 B1 | 5/2002 | Toth et al. |
| 6,525,866 B1 | 2/2003 | Lin et al. |
| 6,529,313 B1 | 3/2003 | Lin et al. |
| 6,574,034 B1 | 6/2003 | Lin et al. |
| 6,577,433 B1 | 6/2003 | Lin et al. |
| 6,788,449 B2 | 9/2004 | Liang et al. |
| 6,822,782 B2 | 11/2004 | Honeyman et al. |
| 6,864,875 B2 | 3/2005 | Drzaic et al. |
| 2003/0132925 A1 | 7/2003 | Lin et al. |
| 2005/0137278 A1 | 6/2005 | Fromm et al. |
| 2005/0239935 A1 | 10/2005 | Kang et al. |
| 2006/0198422 A1* | 9/2006 | Chopra et al. ............... 374/158 |
| 2006/0291033 A1 | 12/2006 | Yang et al. |

OTHER PUBLICATIONS

U.S. Appl. No. 11/169,924, filed Jun. 30, 2005.

* cited by examiner

Primary Examiner—Evelyn A. Lester
(74) Attorney, Agent, or Firm—Oliff & Berridge, PLC

(57) ABSTRACT

An electrophoretic display medium includes at least one set of colored particles in a dielectric fluid, wherein the display medium has an electrical conductivity of about $10^{-11}$ to about $10^{-15}$ S/m. The display medium is included in an electrophoretic display device by including the medium in a multiplicity of individual reservoirs of a display layer or layers that is located between conductive substrates.

23 Claims, 15 Drawing Sheets

ELECTROPHORETIC DISPLAY MEDIUM AND DEVICE

BACKGROUND

Described herein is an electrophoretic display device. More particularly, described is an electrophoretic display device containing colorant particles capable of field-induced charging. The electrophoretic display devices herein are capable of generating images, including full color images. The electrophoretic displays herein may be used for any display application, and particularly any display application where the image displayed may be changed, including, for example, reimageable paper, electronic books, electronic signage, watch, monitor and/or cell phone displays, and the like.

One advantage of field-induced charging is that the colored particles of the display nay be made to more rapidly and reliably respond to an electric field application in displaying an image, potentially with much lower energy costs. This allows for the electrophoretic display device to be used in displays requiring rapid image switching capabilities, for example such as monitors.

Electrophoretic displays are well known in the art. An electrophoretic display generally comprises a suspension of one or two charged pigment particles colloidally dispersed in a clear or colored liquid of matching specific gravity and contained in a cell comprising two parallel and transparent conducting electrode panels. The charged particles are transported between the electrode panels under the influence of an electric field, and can therefore be made to display an image through appropriate application of the electric field on the electrodes. The advantages of electrophoretic displays as a means for providing information and displaying images has been well appreciated.

U.S. Pat. No. 4,272,596, incorporated herein by reference in its entirety, illustrates an electrophoretic display structure. The electrophoretic display device comprises a white marking material such as titanium dioxide suspended in a colloidal dispersion containing black colorant such as colloidal size iron oxide particles known as ferrofluids. Image formation is achieved electrophoretically by selective application of an electric field across the imaging suspension. In particular, a pair of electrodes associated so as to form a cavity therebetween, which cavity is filled with the aforementioned suspension medium. A source of electrical potential is coupled to the electrodes and when an electric field is applied, the marking particles form an image as they follow the field.

U.S. Pat. No. 6,113,810, incorporated herein by reference in its entirety, describes a dielectric dispersion for use in an electrophoretic display that includes a dielectric fluid, a first plurality of particles of a first color having a surface charge of a selected polarity dispersed within the dielectric fluid and a second plurality of particles of a second color having a surface charge of opposite polarity to that of the first plurality and a steric repulsion thereto preventing coagulation of the first and second plurality of particles. Each set of particles is formed with unique secondary and functional monomers. Corresponding charge control agents are added to the dispersion to establish opposite polarities on the respective particles.

U.S. Pat. No. 6,017,584, incorporated herein by reference in its entirety, discloses electrophoretic displays and materials useful in fabricating such displays. In particular, encapsulated displays are disclosed in which particles encapsulated therein are dispersed within a suspending, or electrophoretic, fluid. This fluid may be a mixture of two or more fluids or may be a single fluid. The displays may further comprise particles dispersed in a suspending fluid, wherein the particles contain a liquid. In either case, the suspending fluid may have a density or refractive index substantially matched to that of the particles dispersed therein. Application of electric fields to the electrophoretic displays affects an optical property of the display.

U.S. Pat. No. 6,577,433, incorporated herein by reference in its entirety, discloses an electrophoretic display liquid composition for use in an electrophoretic display device that has a multiplicity of individual reservoirs each containing the display liquid of two sets of particles dispersed in a transparent liquid system as well as at least one charge director dissolved or dispersed in the liquid system, or physically embedded on the surface of the particles or chemically bonded on the surface of the surface of the particles, the two sets of particles exhibiting different, contrasting color and different charging properties from each other. The charge director(s) may include a metal salicylate compound. The particles may be modified with charge controlling agents, and may also include a set of magnetic particles. The transparent liquid system may include two immiscible liquids having different densities with the sets of particles having densities in between the densities of the two immiscible liquids such that the particles rest at an interface between the two immiscible liquids.

U.S. Pat. No. 6,525,866, incorporated herein by reference in its entirety, discloses an electrophoretic display liquid composition for use in an electrophoretic display device that has a multiplicity of individual reservoirs, each containing the display liquid of at least two sets of particles dispersed in a transparent liquid system, the at least two sets of particles exhibiting different, contrasting color and different charging properties from each other, and at least one of the sets of particles containing flow aid particles as additives upon an external surface of the particles. Preferred flow aid additives include silica and titania particles.

Electrophoretic display is thus based on the migration of charged particles suspended in an insulating fluid under the influence of an electric field. The particles used in such displays to date have been charged by adding a charge control agent, which is capable of ionic dissociation, to the dielectric fluid during preparation of the non-aqueous display dispersion. Examples of charge control agents used have included bis-(2-ethyl hexyl) sodium sulfosuccinate and basic barium petronate (BBP). Dissociation of the charge control agent into positive and negative ionic species in the dielectric fluid results in preferential surface absorption of ions of one polarity by the particles. The particles therefore become charged. The resulting dispersion contains a complex mixture of particles including charged particles, excess free ions and counter-ions. Due to the presence of excess free ions, such electrophoretic display inks are characterized by high electrical conductivity. Conductivity has been shown to increase with concentration of the added charge control agent, and is typically 100-1000 times higher compared to the dielectric fluid. High conductivity of the ink results in increased power consumption and slower switching speed of the display.

While known electrophoretic display devices, compositions and processes for displaying images with such known devices are suitable for their intended purposes a need remains for an electrophoretic display that remains stable for long periods of time and that reliably and rapidly displays and/or changes an image, and in particular a full color image.

SUMMARY

In embodiments, described is an electrophoretic display medium, comprising at least one set of colored particles in a dielectric fluid, and wherein the display medium has an electrical conductivity of about $10^{-11}$ to about $10^{-15}$ S/m.

In further embodiments, described is an electrophoretic display device, comprising a multiplicity of individual reservoirs containing a display medium between conductive substrates, at least one of which is transparent, wherein the display medium comprises at least one set of colored particles in a dielectric fluid, and wherein the display medium has an electrical conductivity of about $10^{-11}$ to about $10^{-15}$ S/m.

BRIEF DESCRIPTION OF THE DRAWINGS

FIGS. 2-6 illustrate steps to form the grid pattern on the substrate and FIGS. 7-11 illustrate filling the individual cells and bonding to form the display device.

EMBODIMENTS

Display Device Structures

Structures of electrophoretic display devices in which a display medium may be included will first be described. Use of the electrophoretic display mediums described herein is not, however, necessarily limited to these embodiments, and any other suitable design for an electrophoretic display device may be used without limitation. As an example of a suitable electrophoretic display device design not specifically described herein that may nevertheless be used with the present display medium, U.S. Pat. No. 6,788,449, incorporated herein by reference in its entirety, is identified.

Figure 1:
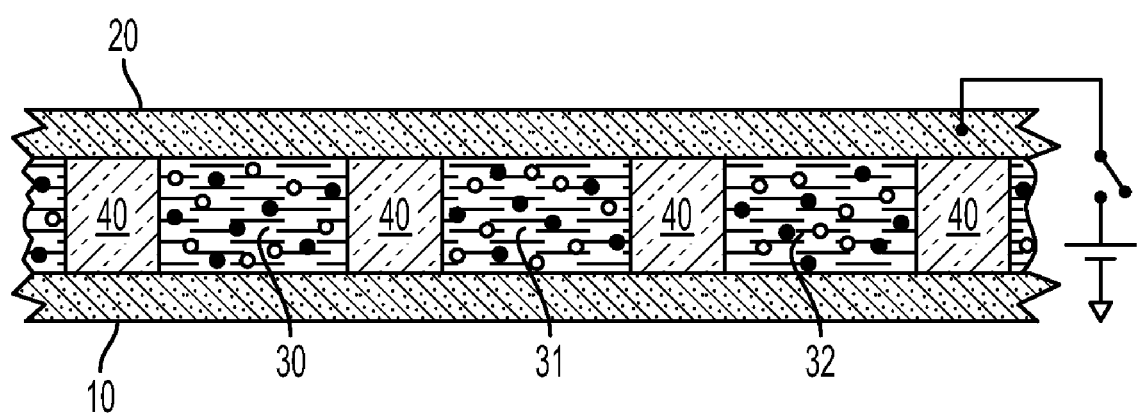
FIG. 1 illustrates an embodiment of an electrophoretic display device.

As illustrated in FIG. 1, an embodiment of an electrophoretic display device comprising two conductive substrates 10 and 20 disposed oppositely of each other, with an electrophoretic or display layer 40 therebetween. The display layer may have a thickness of from, for example, about 5 to about 1,000 μm, such as from about 10 to about 500 μm or from about 20 to about 350 μm.

Layer 40 may be comprised of a layer that includes spacers therein, which spacers define a multiplicity of individual reservoirs that each contain the display medium (30, 31 and 32) comprised of fluid and colored particles. A multiplicity refers to, for example, from about 2 to about 100,000,000, or potentially more, such as from about 100 to about 50,000,000 or from about 1,000 to about 1,000,000. Thus, for example, if each of the multiplicity of reservoirs is about 100 microns across, a square of 1,000×1,000 reservoirs (or about a 4 inch×4 inch display) would have about 1,000,000 total reservoirs. In this regard, each reservoir may be thought to correspond to a pixel of the device. Reservoir refers to, for example, any unit containing, or capable of containing, display medium therein, and includes, for example, units separated by a spacer device, pockets, cavities or bubbles formed in a single sheet or between two sheets, capsules or microcapsules in a sheet or layer, and the like.

In the FIG. 1 embodiment, the particles are shown to include a set of black particles and a set of white particles. However, as will be discussed more fully below, the particles may be comprised of at least one or multiple differently colored particle sets, for example from 1 to about 10 particles sets, such as from 1 to about 6 particle sets or from about 2 to about 4 particle sets.

As the conductive substrates of the electrophoretic display device, any suitable materials may be used without limitation, for example including materials presently known and used or that may be used in the future in the art. At least one of the conductive substrates, in particular at least the top conductive substrate through which the images formed by the device may be viewed, should be transparent in order to enable such viewing. Both substrates may be transparent, if desired. The bottom or back substrate need not be transparent, and may instead be, for example, a light reflecting or light absorbing material. As suitable materials that may be used, mention may be made of conductive polymer films, for example polymer films coated with a transparent conductive material such as indium tin oxide (ITO), such as polyethylene terephthalate (PET) films, for example MYLAR (Du Pont), polyethylene napthalate (PEN) films, polyethersulfone (PES) films and the like, conductive glass films, such as ITO coated glass, and conductive thin metals. For transparency, ITO coated polymer films and glass are suitable. The substrates may either be flexible or rigid.

The substrates that sandwich the spacer layer therebetween may have a length and width corresponding to the overall length and width of the electrophoretic display device. The substrates thus may be continuous, unitary films that are not present as just separated pieces over just individual reservoirs of the display device, although a plurality of segregated substrates may also be used. The substrates may be made to be as thin as possible while still maintaining appropriate conductive properties and structural integrity. For example, the substrates may have a height, or thickness, of from about 10 microns to about 500 microns, such as from about 10 to about 250 microns or from about 20 to about 100 microns.

Between the conductive substrates are contained a multiplicity of individual reservoirs (30, 31, 32), each filled with a display medium described more fully below. Each of the individual reservoirs defines one container and/or cell of the electrophoretic display device.

In embodiments, spacers may be used to keep the individual reservoirs separate from one another. Any suitable spacer design may be used. For example, the spacer may be of the type described in U.S. Pat. No. 7,123,238, incorporated herein by reference in its entirety. The width and/or diameter of the individual reservoirs may be from, for example, about 5 microns to about 400 microns, such as from about 5 to about 200 microns or from about 5 to about 50 microns. Also, the spacer layer 40 may be comprised of more than one layer/sheet, such as from two to about eight layers or from about two to about four layers, for example when pocket sheets having differently colored display mediums therein are stacked together.

The display medium to be used within the reservoirs contains particles of a size smaller than the reservoir width/diameter in order to function.

Where the spacer layer is comprised of a multiplicity of individual reservoirs, a solid portion of the spacer separating the multiplicity of reservoirs, that is, the spacing or partition between individual reservoirs of the spacer layer, are desirably as thin as possible. Preferred spacing/partition thicknesses are on the order of, for example, about 10 microns to about 100 microns, such as from about 10 microns to about 75 microns or from about 15 to about 50 microns.

The display device may have any suitable overall length and width as desired. The electrophoretic display device may also be made to have any desired height, although a total height of from about 30 to about 1,000 microns, such as from about 30 to about 400 microns or from about 50 to about 300 microns, may be used in terms of size and ease of use of the device.

In forming the electrophoretic display device, the reservoirs, for example pockets, of the spacer layer are filled with the display medium and the spacer layer is located over a first, or bottom, conductive substrate. The filling of the reservoirs and location of the spacer over the substrate may be done in any suitable order. In embodiments, the spacer layer may be physically attached to the first conductive substrate or intermediate films, which may be done by any suitable method. Adhesive may be used for convenience, although other attachment methods such as sputtering deposition of the conductive film may also be used. Once the reservoirs are filled with display medium and the spacer is located over the first conductive substrate, the second, or top, conductive substrate, is located over the spacer layer. In non-pocket reservoirs and/or in displays not including any intermediate layers, this may act to seal the reservoirs. The first and second substrates may also be located in association with the spacer layer in reverse order, if desired, and may also be associated with the spacer layer at the same time, for example where the spacer layer comprises a sheet of individually enclosed pockets filled with display medium. Again, the locating of the second conductive substrate in association with the spacer layer may be done by attachment, if desired, by any suitable means, including gluing with an adhesive. Additional intermediate layers may be included between the spacer layer and conductive substrates as desired, and thus the location and/or attachment as described above need not be a direct attachment or association of the spacer to the conductive substrates.

In embodiments, the display device may be made to be flexible. In this embodiment, the substrates are each comprised of a flexible polymeric film, and the spacer comprises a grid pattern on at least one of the substrates. The grid pattern may be integral with one or both of the polymeric film substrates. Integral refers to, for example, the grid pattern walls or sidewalls that segregate the individual cells of the display device being comprised of the same material as the polymeric film substrate and being formed with the polymeric film in the same molding step. For flexibility, each film may have a thickness of from about 5 to about 75 µm, for example from about 10 to about 50 µm or from about 10 to about 30 µm. The overall device including joined films may have a thickness of less than 150 µm, for example from about 10 to about 150 µm or from about 20 to about 75 µm.

The width and/or length of the individual reservoirs of the grid pattern are preferably from, for example, about 5 microns to about 200 microns, such as from about 5 to about 100 microns or from about 10 to about 100 microns. Obviously, the display medium to be used within the reservoirs must contain particles of a size smaller than the reservoir width/length in order for the display to function. The solid portion, that is the walls, of the grid separating the multiplicity of reservoirs, are desirably as thin as possible. Partition thicknesses on the order of, for example, about 10 microns to about 100 microns, for example about 15 to about 50 microns, may be used.

The film with a grid pattern formed thereon has the cells defined by the grid walls filled with display medium, and then the display medium-containing film is joined to another flexible polymeric film substrate, for example a film without a grid pattern thereon or a film itself having a grid pattern and also filled with the same display medium. The joining may be achieved by any method, for example heat sealing and/or with the use of an adhesive. If an adhesive is used, the adhesive may have a repulsive interaction with the display medium so that the display medium is retained in the cells of the grid during joining. For example, if the display medium is hydrophobic an adhesive having hydrophilic characteristics may be used.

To form the flexible polymeric film having the grid pattern formed thereon, a master for molding (micromolding) is first prepared. This may be done by any suitable technique, for example through appropriate exposure (for example through a photomask) and development of a photoresist material film such as SU-8 (a commercially available (Microchem Corp.) spun-on epoxy) located on a substrate, for example glass. Additional suitable materials and microfabrication techniques for forming a master may also be used, for example including etching into a silicon or glass or fabricating by electroplating or electroless plating. U.S. Patent Publication No. 2005/0239935, incorporated herein by reference in its entirety, describes methods and materials for the molding steps. The developed pattern corresponds to the desired grid pattern of the flexible film substrate.

In addition, the surface of the master may be coated with a low surface energy coating or a release layer. Examples include fluoropolymers such as TEFLON AF (DuPont), CYTOP (Asahi Glass), long-chain fluorinated alkylchlorosilanes, mixtures thereof and the like.

A reverse image master stamp is then prepared, which master stamp is used in forming the final flexible polymeric film with the grid pattern formed therewith and thereon. To produce the master stamp from the master, a material having good release properties, for example a silicone material such as PDMS (polydimethylsiloxane) (available as SYLGARD 184 from Dow Corning) may be used. Other materials for the master stamp/mold that may be used include, for example, any polymer having, or treated to have, suitable release properties, for example including UV curable polymers, or a metal mold, for example nickel, which enables the lifetime of the mold to be longer. The mold may be coated with a release agent such as a fluorocarbon (for example CYTOP), a low surface energy silane (for example, OTS or a fluorosilane) or a silicone. Commercially available release agents such as Taylor T-WET 630 or Taylor T-SIL 50 may be used.

Figure 2:
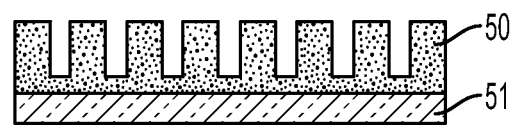
FIGS. 2-11 illustrate a process of making a flexible electrophoretic display device in which the display layer comprises a grid pattern formed on a conductive substrate to define individual cells each filled with display medium.
Figure 3:
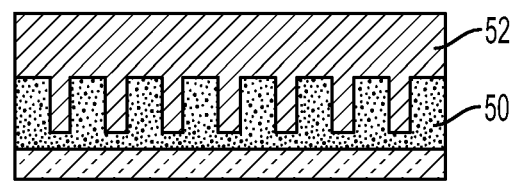
Figure 4:
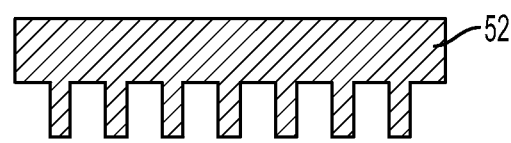

An example process for forming the master stamp is illustrated in FIGS. 2-4. To make the master stamp 52, the material thereof, for example a silicone, may be mixed with a curing agent at a ratio of material to curing agent of, for example, from about 50:1 to about 5:1 such as from about 25:1 to about 5:1 or from about 10:1 to about 5:1. Suitable curing agent materials depend upon the material used to make the stamp. For example, for SYLGARD 184 PDMS, a suitable curing agent may include a mixture containing crosslinker, inhibitor/moderator, and silicone reinforcing resin. Examples of crosslinkers include hydride functional siloxane crosslinker material such as HMS-151 (methylhydrosiloxane-dimethylsiloxane copolymer), available from Gelest. Examples of inhibitor/moderator include tetramethyltetravinylcyclotetrasiloxane. Examples of silicone reinforcing resin include vinyl "Q" reinforcing resin, a vinyl terminated PDMS such as VQM-135 available from Gelest. The master microcell array 50, optionally on a substrate 51 such as glass and the like, is placed face up in a holder, for example a TEFLON bolder, that aids in releasing the mold after curing. The material for the master stamp/mold such as silicone is then applied over the cells in a thin layer (FIG. 2). The mixture may be evacuated to remove any entrapped air. Optionally, remainder of the mixture may be applied over the mold and again evacuated to remove all air bubbles. The material is then cured, for example at about 25° C. to about 300° C., such as from about 25° C. to about 250° C. or from about 50° C. to about 200° C., and/or solidified, and thereafter the master stamp 52 is removed from the master 50 (FIG. 4).

Figure 5:
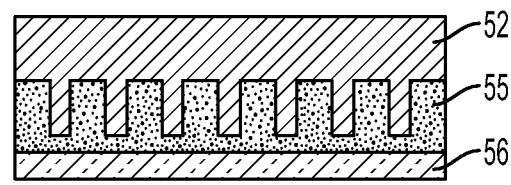
Figure 6:
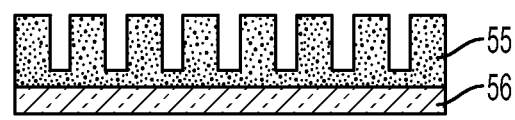

The flexible polymeric substrate 55 may then be formed from the master stamp. As the polymer, a substantially clear lower viscosity material may be used, for example a material such as a curable, for example UV curable, adhesive. For example, an epoxy acrylic such as 60-7155 from Epoxies, Etc., or a urethane acrylic such as 60-7165 (Epoxies, Etc.), may be used. Other materials such as described in U.S. Publication No. 2005/0239935 may also find application here. The polymer is not limited to UV curable polymers; thermoplastic polymers, thermally cross-linking polymers or two component reactive systems may also be chosen. A release agent, for example such as Duponol WAQ (sodium lauryl sulfate) in isopropanol, Dow Corning 230 fluid (alkylaryl polysiloxane fluid) diluted with chloroethylene, and/or petroleum jelly in a chlorinated solvent may be applied to the silicone master stamp 52 to aid in separation of the cured polymeric film therefrom following molding. The polymeric material 55 is applied to the silicone master stamp and/or spread across the surface of a flexible substrate 56 such as ITO coated MYLAR, and the master stamp is pressed into the polymeric material 55 so as to completely fill the cells of the master stamp 52 (FIG. 5). The pressure may be uniformly applied, for example through use of a roller. A flat plate may also be placed on the sample and clamped to provide uniform pressure during curing. The sample may then be cured, for example via exposure to UV light and/or to an elevated temperature, for example for about 5 to about 60 seconds, such as about 30) seconds, using a DYMAX 5000-EC 400W UV exposure system. The sample may be removed from the clamps and cured for an additional amount of time, for example for about 5 seconds to about 30 seconds, such as about 10 seconds. The film 55 oil the substrate 56 may then be peeled away from the master stamp (FIG. 6). The final film with grid pattern may be rinsed, for example with isopropanol and the like, to remove any residue.

In embodiments, the substrate may be non-flexible, such as glass, ITO coated glass and the like. In this case, a flat film of the polymer is first formed on the rigid substrate, and then peeled therefrom and placed on a flexible substrate for further processing as above.

The flexible polymer film with the grid pattern thereon may then be filled with display fluid and bonded to form the display device. The display fluid may be applied across the film to fill the cells of the grid pattern, and typically excess display fluid is wiped or scraped off of the edges before bonding. It is desirable for the fluid to be localized in the cells only, and the bonding surfaces clean and free of residual fluid.

Figure 7:
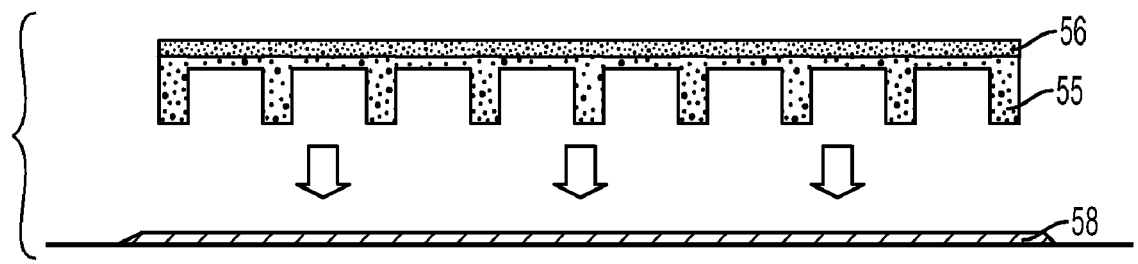
Figure 8:
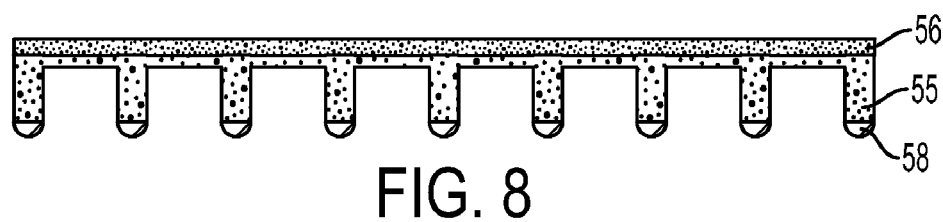
Figure 9:
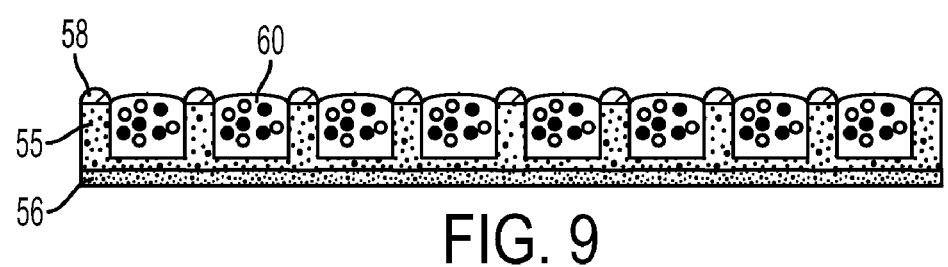

As an additional step, the bonding surfaces of the film may be modified so as to have a lower surface energy than the surface tension of the fluid. In this way, the fluid will not wet the bonding surface. For example, by stamping the polymeric film with a low surface energy material, for example such as a fluorocarbon polymer, a silane or an alkyl chain material of, for example, about 8 to about 1,000 carbon atoms in length, the stamped edges will not be wet by the fluid of the display medium in the cells, ensuring a good bond to another film. The aforementioned low surface energy materials typically have a surface energy that is lower than the fluid of the display medium, which may be, for example, a silicone fluid or ISOPAR. The coating of the bonding edges may be achieved by, for example as shown in FIGS. 7 and 8, stamping or contacting the top surface of the flexible film 55 with a low surface energy material 58 so as to coat the tops of the grid/cells with the material. Upon subsequent filling of the cells with display medium 60 (FIG. 9), the display medium does not wet the tops of the cells so as to be retained in the cells and so as to keep the top surface of the cells free of display medium that might interfere with subsequent bonding of these surfaces.

Figure 10:
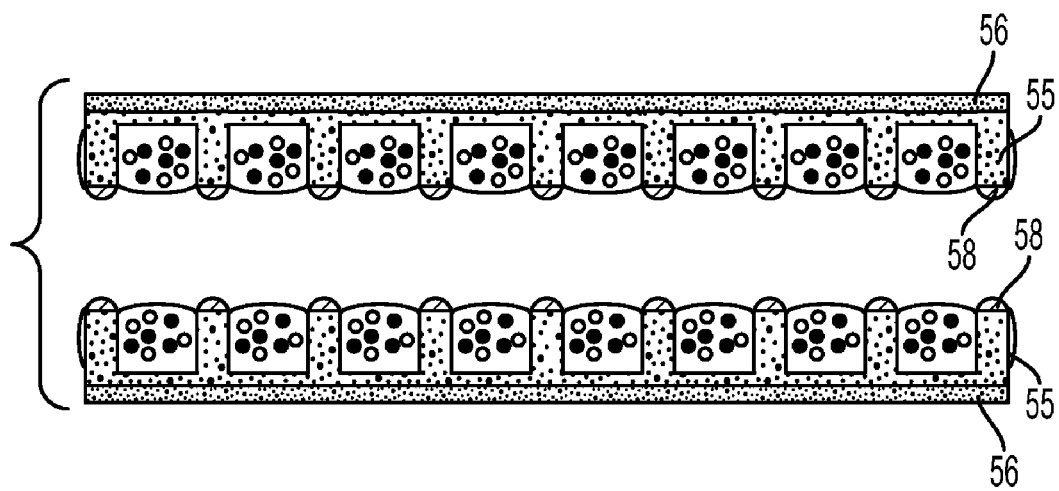
Figure 11:
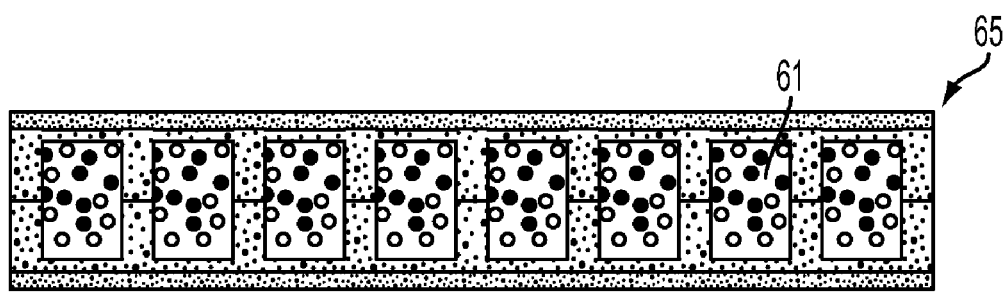
Figure 12:
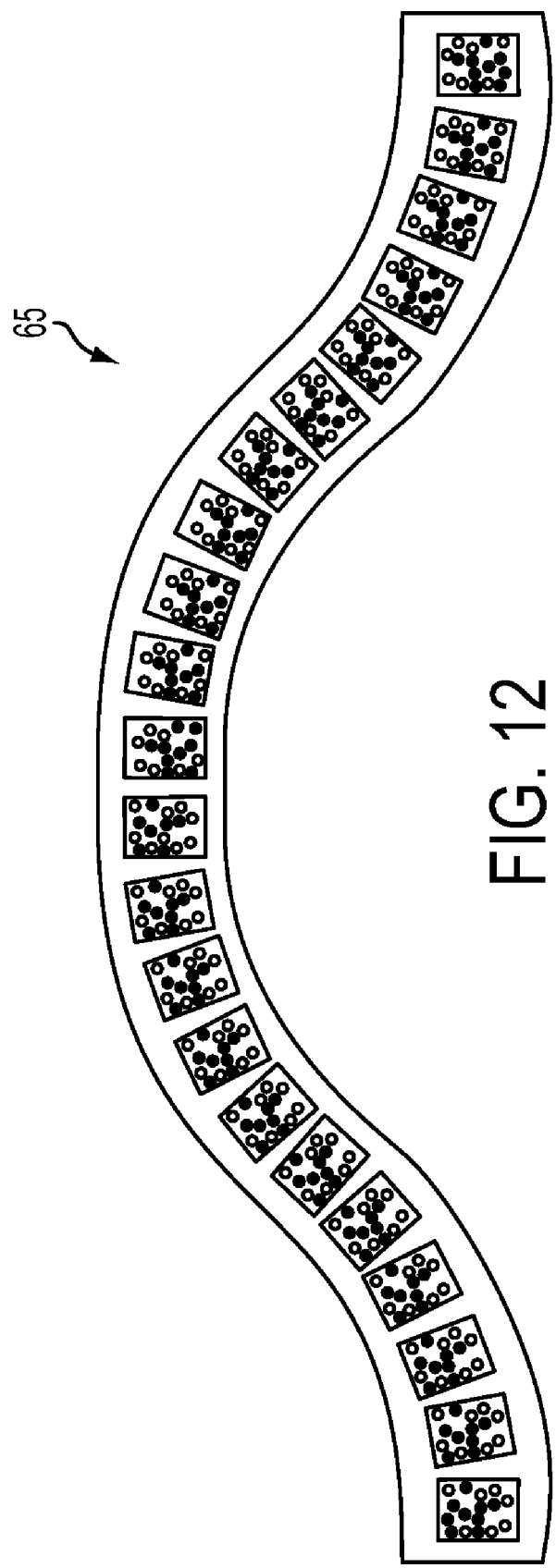
FIG. 12 illustrates a flexible electrophoretic display device.

FIGS. 10 to 12 illustrate an example process for bonding two filled polymeric films 55 together to create the flexible display device 65 containing the display medium in individual cells 61. The adhesion between the two films may be strengthened through the use of heat, pressure and/or light exposure. The final flexible device 65 includes individual cells 61 filled with the display medium as shown in FIGS. 11 and 12.

Of course, the foregoing procedure for making flexible film substrates can also be used to similarly make non-flexible display devices. In this regard, the rigid substrate, for example ITO coated glass and the like, may have the grid pattern formed thereon as in the process for forming the master discussed above. For example, a photoresist material such as SU-8 and the like may be spun onto the substrate, exposed via a photomask, and developed to form the grid pattern on the substrate.

Similarly, a photolithographically defined grid pattern may also be formed on a flexible substrate such as a 50 micron thick sheet of MYLAR (which may be coated with a conducting ITO layer). In this case, the flexible substrate may have to be attached to a rigid substrate during the processing to ensure flatness during the processing. One way to attach a flexible substrate to a rigid substrate is via a double sided UV-release adhesive tape such as UC-228W-110 from Furukawa Electric Co, Ltd.

As an example, SU-8-25 (Microchem Corp.) may be spun on the substrate at about 1,000 to about 3,000 rpm, for example about 2000 rpm, to provide a film having a thickness of about 10 to about 100 µm such as from about 20 to about 50 µm or from about 20 to about 40 µm. The spun on coating may be baked, for example on a leveled hotplate, and for example for about 1 to about 20 minutes, for example about 5 min, at about 80 to about 150° C., for example at about 115° C. The photoresist is then exposed to UV light, for example having a wavelength of about 340-400 nm for about 2 to about 10 min such as about 3 min at 8 mW/cm² through a photomask. An optional post-exposure bake may be conducted on the hotplate for about 1 to about 20 minutes, for example about 5 min, at about 80 to about 150° C., for example at about 115° C. The photoresist is then developed in a suitable developer, for example PGMEA (propylene glycol monomethyl ether acetate, which is a suitable developer for SU-8; other photopolymers may require different developers, as understood in the art). The developed photoresist film may then be rinsed with isopropanol or the like, and subjected to a final hardbake, for example at about 100 to about 250° C. such as about 150° C. for about 1 to about 20 minutes, for example for about 5 minutes. Thereafter, a low surface energy surface coating may be applied, for example such as a CYTOP coating (an amorphous soluble perfluoropolymer film, available from Asahi Glass Co.). The low surface energy coating forms a nonstick film to prevent adhesion of particles to the electrode or polymer film. The coating may have a thickness of from, for example, about 10 to about 1,000 nm, such as from about 50 to about 250 nm or from about 100 to about 200 nm.

Figure 13:
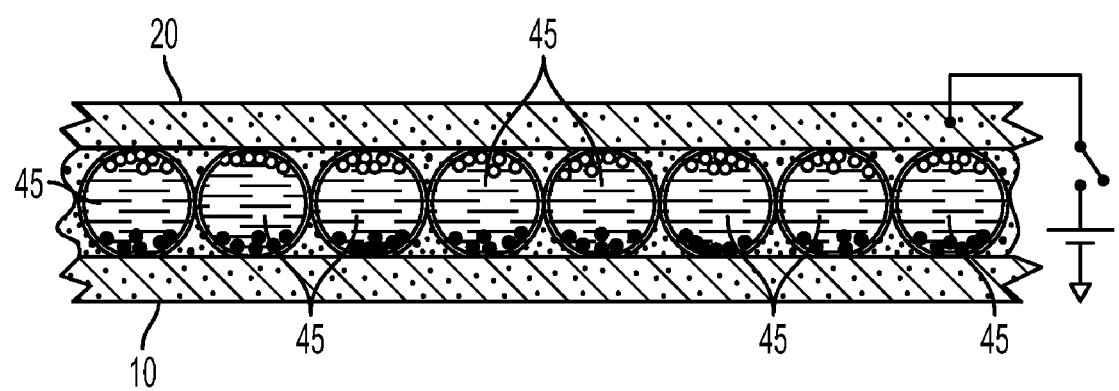
FIG. 13 illustrates another embodiment of an electrophoretic display device.

Another embodiment of a suitable electrophoretic display device is illustrated in FIG. 13. In FIG. 13, the electrophoretic display device again comprises conductive substrates 10 and 20 disposed oppositely of each other. However, in this embodiment, the layer between the substrates is comprised of a multiplicity of microcapsules 45 that have electrophoretic display medium encapsulated therein. The microcapsules may be held in a suitable matrix material. A similar electrophoretic display device utilizing microcapsules is described in U.S. Pat. No. 6,017,584, incorporated herein by reference in its entirety. The microcapsules may be made to have a size (diameter) of from, for example, about 5 microns to about 1,000 microns, such as from about 5 to about 200 microns or from about 5 to about 50 microns.

In this embodiment, the microcapsules may be prepared and filled with the display medium, and then the microcapsules are fixed or glued onto one or both of the conductive substrates, or onto intermediate layers between the microcapsules and the substrates, or onto other layers of microcapsules in the device if multiple layers are used. Desirably, the microcapsules form a monolayer (a layer having a thickness substantially corresponding to the average diameter of the microcapsules of that layer) in the display layer of the display device. However, multiple layers, for example 2 to about 10 or 2 to about 4, may also be used.

For making the microcapsules any suitable method of encapsulation may be used. The process of encapsulation may include conventional or complex coacervation, interfacial polymerization, in-situ polymerization, electrolytic dispersion and cooling, or spray-drying processes. In these processes, the display medium is added to a solution of the wall-forming material to be encapsulated thereby, and the resulting encapsulated microspheres may be subjected to crosslinking. The microcapsules may be prepared using melamine-formaldehyde, urea-formaldehyde, resorcinol-formaldehyde, phenol-formaldehyde, gelatin-formaldehyde, isocyanate-polyol, interpolymer complexes of two oppositely charged polymers such as gelatin/gum arabic, gelatin-polyphosphate, and poly(styrene sulfonic acid)/gelatin, hydroxypropyl cellulose, mixtures and/or combinations of the foregoing, and the like, as microcapsule wall-forming materials.

The interfacial polymerization approach relies on the presence of an oil-soluble monomer in the electrophoretic composition, which is present as an emulsion in an aqueous phase. The monomers in the minute hydrophobic droplets react with a ionomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Coating aids can be used to improve the uniformity and quality of the coated or printed electrophoretic ink material. Wetting agents are typically added to adjust the interfacial tension at the coating/substrate interface and to adjust the liquid/air surface tension. Wetting agents include, for example, anionic and cationic surfactants, and nonionic species, such as silicone or fluoropolymer-based materials. Dispersing agents may be used to modify the interfacial tension between the capsules and binder, providing control over flocculation and particle settling.

Surface tension modifiers may be added to adjust the air/ink interfacial tension. Polysiloxanes are typically used in such an application to improve surface leveling while minimizing other defects within the coating. Surface tension modifiers include, for example, fluorinated surfactants, such as, for example, the ZONYL series from DuPont, the FLUO-RAD series from 3M (St. Paul, Minn.), and the fluoroalkyl series from Autochem; siloxanes, such as, for example, SILWET from Union Carbide; and polyethoxy and polypropoxy alcohols. Antifoams, such as silicone and silicone-free polymeric materials, may be added to enhance the movement of air from within the ink to the surface and to facilitate the rupture of bubbles at the coating surface. Other useful antifoams include, for example, glyceryl esters, polyhydric alcohols, compounded antifoams, such as oil solutions of alkylbenzenes, natural fats, fatty acids, and metallic soaps, and silicone antifoaming agents made from the combination of dimethyl siloxane polymers and silica. Stabilizers such as UV-absorbers and antioxidants may also be added to improve the lifetime of the ink.

The coacervation approach may utilize an oil/water emulsion. One or more colloids are coacervated (that is, agglomerated) out of the aqueous phase and deposited as shells around the oily droplets through control of temperature, pH and/or relative concentrations, thereby creating the microcapsule. Materials suitable for coacervation include gelatins and gum arabic. See, for example, U.S. Pat. No. 2,800,457, incorporated herein by reference in its entirety.

In an example complex coacervation process, the display medium to be encapsulated is emulsified with the wall forming material, for example a mixture of water, gelatin and gum arabic, at an elevated temperature of, for example, about 30° C. to about 80° C. such as from about 35° C. to about 75° C. or from about 35° C. to about 65° C. The pH is then reduced, for example to less than 5 for example from about 4 to about 5 such as from about 4.4 to about 4.9, through addition of an acid such as acetic acid and the like, to induce coacervation. The microencapsulated particles are then cooled. The material of the wall of the microcapsules may then be crosslinked, for example by adding gluteraldehyde and the like and agitating the mixture in the presence of, for example, urea.

The microcapsules may have a multi-layer wall around the core solid and/or liquid encapsulants. These can be made, for example, by first forming a thin wall by an interfacial polymerization reaction, and subsequently forming a second, thicker wall by an in-situ polymerization reaction or by a coacervation process. The first wall of the microcapsule may be typically comprised of polyurea, polyurethane, polyamide, polyester, epoxy-amine condensates, silicones and the like. The second wall of the microcapsule may be comprised of condensates of melamine-formaldehyde, urea-formaldehyde, resorcinol-formaldehyde, phenol-formaldehyde, gelatin-formaldehyde, or interpolymer complexes of two oppositely charged polymers such as gelatin/gum arabic and poly(styrene sulfonic acid)/gelatin.

A semi-continuous miniemulsion polymerization process may also be used to encapsulate the electrophoretic display medium, for example as described in U.S. Pat. No. 6,529,313, incorporated herein by reference in its entirety.

A benefit of encapsulating the electrophoretic display medium is that the microcapsules can be made to be spherical as shown in FIG. 13 or other than spherical through control of the process. Different shapes may permit better packing density of the microcapsules and better display quality.

Once generated, the microcapsules are then located over or adhered to one of the conductive substrates of the device, either directly or via intermediate layers therebetween. The microcapsules may be adhered to the conductive side of the substrate, for example the side having a conductive ITO coating thereon. The adhering may be achieved by, for example, using any suitable binder such as an adhesive or polymer matrix material that is either mixed with the microcapsules prior to coating the microcapsules on the substrate, coated onto the substrate before placement of the microcapsules thereon, coated upon the microcapsules after placement upon the substrate, or one or more of the above, including all three.

As an adhesive or binder, any material may be used, for example including polyvinyl alcohol (PVA) or polyurethane such as NEOREZ. A binder may be used as an adhesive medium that supports and protects the capsules, as well as binds electrode materials to the capsule dispersion. A binder can be non-conducting, semiconductive, or conductive. Binders are available in many forms and chemical types. Among these are water-soluble polymers, water-borne polymers, oil-soluble polymers, thermoset and thermoplastic polymers, and radiation-cured polymers.

Among water-soluble polymers are various polysaccharides, polyvinyl alcohols, N-methylpyrrolidone N-vinylpyrrolidone, various CARBOWAX species (Union Carbide), and poly(2-hydroxyethyl acrylate).

The water-dispersed or water-borne systems are generally latex compositions, for example NEOREZ and NEOCRYL resins (Zeneca Resins), ACRYSOL (Rohm and Haas), BAYHYDROL, (Bayer), and the HP products (Cytec Industries). These are generally lattices of polyurethanes, occasionally compounded with one or more of acrylics, polyesters, polycarbonates or silicones, each ending the final cured resin in a specific set of properties defined by glass transition temperature, degree of tack, softness, clarity, flexibility, water permeability and solvent resistance, elongation modulus and tensile strength, thermoplastic flow, and solids level. Some water-borne systems can be mixed with reactive monomers and catalyzed to form more complex resins. Some can be further cross-linked by the use of a cross-linking reagent, such as an aziridine, for example, which reacts with carboxyl groups.

Examples of a water-borne resin and aqueous capsules is provided in U.S. Pat. No. 6,822,782, incorporated herein by reference in its entirety.

Thermoset systems may include the family of epoxies. These binary systems can vary greatly in viscosity, and the reactivity of the pair determines the "pot life" of the mixture. If the pot life is long enough to allow a coating operation, capsules may be coated in an ordered arrangement in a coating process prior to the resin curing and hardening.

Thermoplastic polymers, which are often polyesters, are molten at high temperatures. A typical application of this type of product is hot-melt glue. A dispersion of heat-resistant capsules could be coated in such a medium. The solidification process begins during cooling, and the final hardness, clarity and flexibility are affected by the branching and molecular weight of the polymer.

Oil or solvent-soluble polymers are often similar in composition to the water-borne system, with the obvious exception of the water itself. The latitude in formulation for solvent systems is enormous, limited only by solvent choices and polymer solubility. Of considerable concern in solvent-based systems is the viability of the capsule itself; the integrity of the capsule wall cannot be compromised in any way by the solvent.

Radiation cure resins are generally found among the solvent-based systems. Capsules may be dispersed in such a medium and coated, and the resin may then be cured by a timed exposure to a threshold level of ultraviolet radiation, either long or short wavelength. As in all cases of curing polymer resins, final properties are determined by the branching and molecular weights of the monomers, oligomers and cross-linkers.

A number of "water-reducible" monomers and oligomers are, however, marketed. In the strictest sense, they are not water soluble, but water is an acceptable diluent at low concentrations and can be dispersed relatively easily in the mixture. Under these circumstances, water is used to reduce the viscosity (initially from thousands to hundreds of thousands centipoise). Water-based capsules, such as those made from a protein or polysaccharide material, for example, could be dispersed in such a medium and coated, provided the viscosity could be sufficiently lowered. Curing in such systems is generally by ultraviolet radiation.

The microcapsules may be arranged in abutting, side-by-side relationship and in embodiments are arranged in a monolayer (that is, the microcapsules are not stacked) between the conductive substrates. However, more than one layer of microcapsules may also be used.

Figure 14:
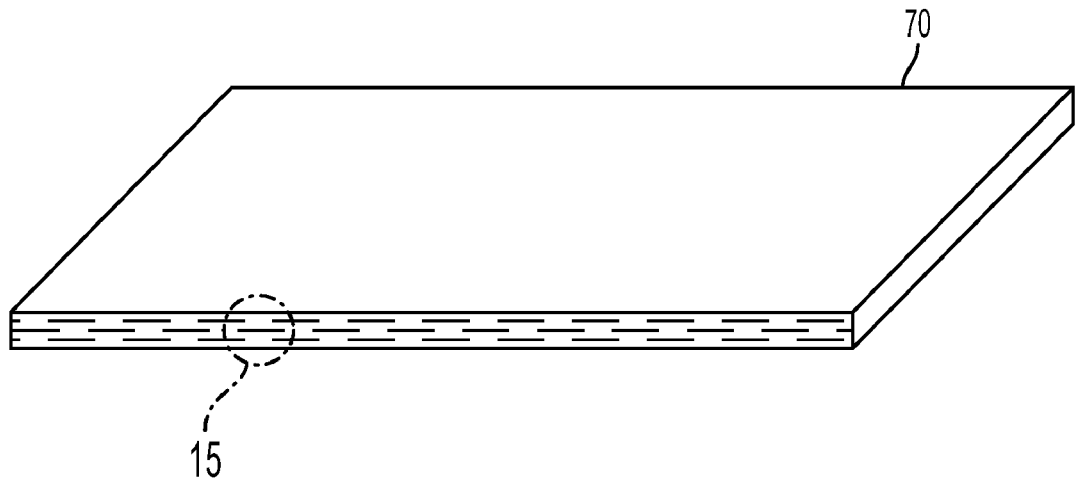
FIGS. 14 and 15, in which FIG. 15 in an inset of FIG. 14, illustrate a display layer having a multiplicity of cavities filled with display medium.
Figure 15:
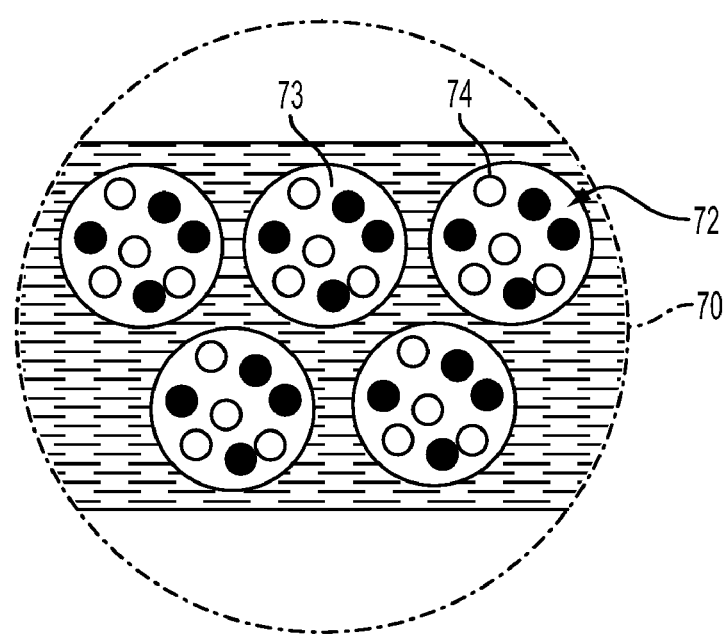

In a still further embodiment, the display device is comprised of at least one layer, for example one to ten layers such as one to four layers or one to two layers, and specifically one layer, of a binder, for example a transparent binder, containing therein multiple individual cavities or pockets that contain display medium therein. For example, as shown in FIGS. 14 and 15, the binder layer 70 contains multiple cavities 72 therein, with cavities filled with fluid 73 and particles 74 of the display medium. If desired, different layers may be used for different color display mediums. The transparent binder layer may be incorporated into either rigid or flexible display devices.

This embodiment thus relates to a way of incorporating the display medium into a display layer of the device that can easily be applied to create large area display devices on a substrate. Essentially, the sets of particles of the display medium are first incorporated into a composite particle also comprised of a sacrificial binder, that is, a binder that will subsequently be removed. Following incorporation of the composite particle into the binder of the binder layer, the sacrificial binder is removed, and the space occupied in the binder layer by the composite particles become cavities or voids containing the particles of the display medium. The liquid of the display fluid may then be added to fill the cavities either at the time of removal of the sacrificial binder or subsequent to removal of the sacrificial binder.

Thus, composite particles comprised of the sets of particles of the display medium and a sacrificial binder are first formed. The composite particles may have a size that corresponds substantially to the size of the cavities to be formed in the binder layer. For example, the composite particles and cavities formed therefrom may have a size of form about 5 to about 1,000 µm such as from about 10 to about 350 µm or from about 20 to about 200 µm.

As the sacrificial binder of the composite particles, use may be made of waxes such as polyethylene or polypropylene waxes, for example POLYWAX waxes from Baker Petrolite. Additional materials that dissolve in the presence of the fluid of the display medium or that may be melted and removed from the binder layer may also be used. For example, additional sacrificial binder materials include a thermoplastic wax, a synthetic microcrystalline wax, a crystalline polyethylene wax, or other wax-like materials that may have a melting point in the range of about 50° C. to about 200° C. and a sharp melting/crystallization temperature of less than about 5° C. Other examples include waxes such as carnauba wax, candelilla wax, castor wax, or the like.

The term wax refers to, for example, a low-melting organic mixture of compound of high molecular weight, solid at room temperature, and generally similar in composition to fats and oils except that it contains no glycerides. Some are hydrocarbons, others are esters of fatty acids and alcohols. They are classed among the lipids. Waxes are thermoplastic, but because they are not high polymers, they are not considered in the family of plastics. Common properties are: water repellency, smooth texture, low toxicity, freedom from objectionable odor and color. They are combustible and have good dielectric properties; soluble in most organic solvents, insoluble in water. The major types are as follows: natural: (1) animal (beeswax, lanolin, shellac wax, Chinese insect wax); (2) vegetable (carnauba, candelilla, bayberry, sugar cane); (3) mineral: fossil or earth waxes (ozocerite, ceresin, montan); petroleum waxes (paraffin, micro-crystalline) (slack or scale wax). Synthetic: (1) ethylenic polymers and polyol ether-esters (CARBOWAX, sorbitol); (2) chlorinated naphthalenes (HALOWAX); (3) hydrocarbon type, that is, Fischer-Tropsch synthesis.

Examples of such commercially available materials and their sources include polyethylene and polypropylene waxes and their modified derivatives. One example of a polyethylene wax is POLYWAX 1000, manufactured by the Baker-Petrolite Corporation. This material is a nearly crystalline polyethylene wax with a narrow molecular weight distribution, and, consequently, a narrow melt distribution. This material retains a low melt viscosity until just above the melting temperature, a desirable property for the spherodization of the particles. Other examples include lower molecular weight POLYWAX materials, such as POLYWAX 400, POLYWAX 500, POLYWAX 600, POLYWAX 655, POLYWAX 725, POLYWAX 850, as well as higher molecular weight POLYWAX materials such as POLYWAX 2000, and POLYWAX 3000. Other examples of commercially available polyethylene waxes include members of the LICOWAX product line, available from Clariant. Examples of such materials include: LICOWAX PA520 S, LICOWAX PE130, and LICOWAX PE520, as well as micronized polyethylene waxes such as CERIDUST 230, CERIDUST 3615, CERIDUST 3620, and CERIDUST 6071.

Examples of commercially available montan waxes include LICOLUB CaW 3, LICOWAX E, LICOWAX OP, all available from Clariant.

A commercially available synthetic form of carnauba wax is PETRONAUBA C, available from Baker-Petrolite Corporation.

Examples of polypropylene waxes include LICOMONT AR504, LICOWAX PP230, CERIDUST 6071, CERIDUST 6072, CERIDUST 6721 (Clariant).

Examples of modified polyethylene waxes include linear alcohol waxes such as UNILIN alcohols including UNILIN 350, UNILIN 425, UNILIN 550 and UNILIN 700 (Baker-Petrolite Corporation); linear carboxylic acid such as UNICID carboxylic acid polymers including UNICID 350, UNICID 425, UNICID 550, and UNICID 700 (Baker-Petrolite Corporation); oxidized polymer materials such as CARDIS 314, CARDIS 36, CARDIS 320 (Baker-Petrolite Corporation) and oxidized polyethylene waxes such as PETROLITE C-8500, PETROLITE C-7500, PETROLITE E-2020, PETROLITE C-9500, PETROLITE E-1040 (Baker-Petrolite Corporation).

Furthermore, in addition to waxes, different polymer materials, including other low polymers, can also be utilized herein so long as the desired properties and characteristics are produced thereby. Examples of such additional polymers include, for example, maleic anhydride-ethylene copolymers, maleic anhydride polypropylene copolymers, nylons, polyesters, polystyrene, poly(chloromethylstyrene), and acrylates such as polymethylmethacrylate.

Commercially available examples of maleic anhydride-ethylene copolymers include CERAMER polymers such as CERAMER 1608, CERAMER 1251, CERAMER 6, and CERAMER 5005 (Baker-Petrolite Corporation). Commercially available examples of maleic functional polypropylene polymers include X-10036 and X-10016 (Baker-Petrolite Corporation). Commercially available examples of propylene-ethylene copolymers include PETROLITE copolymers such as PETROLITE EP-700, PETROLITE EP-1104, PETROLITE EP-1100, and PETROLITE EP-1200 (Baker-Petrolite Corporation).

The composite particles may be comprised of from about 25% to about 90% by total weight of the particles of sacrificial binder, for example from about 35% to about 80% by total weight or from about 35% to about 70% by total weight.

The composite particles are formed by blending the sets of particles of the display medium with the sacrificial binder, and forming composite particles of the desired size therefrom. Any suitable blending and particle formation process may be used.

Following formation of the composite particles, an appropriate amount of the composite particles, for example from about 10% to about 80% by weight of the binder layer, such as from about 10% to about 70% or from about 20% to about 65% by weight of the binder layer, is mixed with the binder material of the binder layer. A binder layer of desired thickness might then formed by any suitable layer forming method.

As the binder of the binder layer, any optically transparent material may be used. For example, any of the binders described above for use with microcapsules may be used. In embodiments, it is desirable for the binder layer to be able to be plasticized or swollen by the fluid 73 in order to extract out the sacrificial polymer material to form the cavities. The binder layer should not be decomposed by the fluid 73. A means of achieving this is to crosslink the binder layer to enable swelling with solvent without decomposition. The polymeric material used in embodiments to form the polymeric sheet may include, for example, one or more polymeric materials selected from elastomeric materials, such as RTV silicone or any of the SYLGARD silicone elastomers from Dow Corning, thermally or UV curable polyurethane resin, thermally or UV curable epoxy resin, and one or more curing agents. Curing may be accomplished by any suitable method such as thermal, UV, moisture, e-beam, or gamma radiation. Where flexibility is desired, use of silicone elastomers is effective. However, additional optically transparent binder materials may also be used, such as, for example, polyethylene, polyester, epoxy, polyurethane, polystyrene, plexiglass, mixtures thereof and the like.

The binder layer, and thus the display layer of the display device, may have a thickness of from about 5 to about 1,000 µm, for example from about 10 to about 500 µm or from about 20 to about 350 µm.

In the binder layer, the composite particles act as a template to create the cavities inside the transparent binder layer. Once formed into a layer or layers, the binder layer or layers are subjected to a treatment that removes the sacrificial binder from the composite particles embedded therein. This may involve, for example, a solvent treatment procedure that dissolves the sacrificial binder, a treatment at an elevated temperature to melt and remove the sacrificial binder, combinations thereof, and the like. For example, the sheet may be subjected to an ultrasonic treatment in the presence of the fluid of the display medium. The sacrificial binder diffuses out of the binder layer, leaving the particles of the display medium in the cavities formed by the composite particles. When the sacrificial binder removal step is conducted using the fluid of the display medium, the sacrificial binder is replaced with the fluid of the display medium, thus leaving the cavities filled with the display medium. The binder layer may alternatively be swollen with the fluid of the display medium following the sacrificial binder removal step, filling the cavities containing the particles with the display medium fluid.

In embodiments, the display device may also be made to include an absorptive backplane, for example a light absorptive backplane. Very thin display devices with substantially clear substrates such as ITO coated glass or ITO coated polymer such as MYLAR may exhibit low optical density, and a washed out appearance with low color saturation. A highly absorptive backplane may reduce the light transmission through the device, thereby eliminating the washed out appearance of the display. The contrast is greater, and the color saturation appears higher.

The absorptive backplane may desirably have a black color. This may be achieved by any suitable method. For example, a black colored film or paint may be added onto the back of a transparent substrate. The absorptive backplane may be applied either before or after formation of the device, for example before formation of a grid pattern on the substrate and/or assembly of the film into a display device, or after assembly of the device but before electrode attachment. Also, the coloring agent imparting the dark color such as black may be incorporated directly into the conductive substrate layer itself, such that the conductive substrate acts as both the conductive layer and the absorptive backplane.

The display device may also include a color filter. The color filter may be placed over the display layer, over the top conductive substrate or between the top conductive substrate and the display layer(s) having the display medium therein. A color filter is useful when the display device otherwise has a two color capability, for example because it is comprised of a white colored particle set in a colored, for example black, fluid, or because it is comprised of two differently colored particles in a display fluid, for example black and white particles. The color filter can impart fuller color capabilities to such display devices, for example increasing the two color capability to eight total colors as described below.

A multiple color display thus may be achieved by placing filters of different colors, for example red, green, blue, yellow, cyan or magenta, etc., over the viewing side of individual cells. A color filter of the colors red, green, and blue can be advantageously used. Moreover, the color filter nay comprise stripes of the different colors. The color filter is desirably comprised of transparent materials such as transparent polymer films that are tinted with colorant such as pigments, dyes or mixtures of pigments and dyes to have the appropriate color yet remain substantially transparent. Thus, the colorant may be present in the transparent material of the color filter in an amount of from about 0.1% to about 10% by weight, for example from about 0.5% to about 5% by weight.

By placing the color filter over a cell of the display device that includes an appropriate number of color switchable reservoirs therein, multiple colors may be achieved. For example, if each color of the color filter has a switchable portion of the cell associated therewith so as to be independently driven, multiple colors may be achieved. In other words, each colored section of the color filter is associated with an underlying section of the display layer that may be independently addressed via the conductive substrate so that control of each section of the display layer may be made to control the color displayed, as explained more fully below.

In embodiments, the color filter layer includes a multiplicity of color filter sections, each comprised of the different colors of the color filter. In this manner, a larger, full color display may be made by the device. In these embodiments, the color filter sections may each correspond to a pixel of the display. As such, the color filter layer may include from, for example, about 2 to about 100,000,000, or potentially more, such as from about 100 to about 50,000,000 or from about 1,000 to about 10,000,000, color filter sections.

Figure 16:
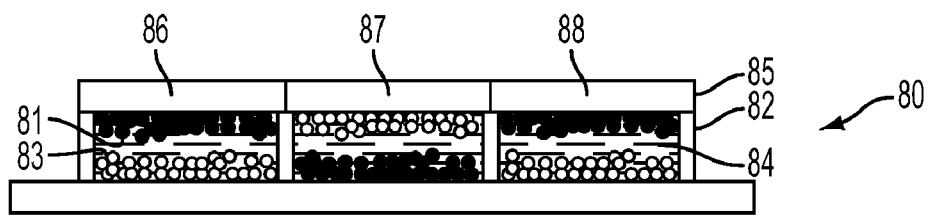
FIG. 16 illustrates a display device including a color filter.

FIG. 16 illustrates a display device 80 including a display layer 82 with individual cells 84 of black and white particles therein. A color filter 85 is placed over the cell, the color filter including a red 86, green 87 and blue 88 stripe. In this manner, eight colors may be displayed. For example, red may be displayed by driving the cell to have white particles 83 display below the red stripe, and black 81 below the blue and green. Green and blue may be similarly displayed by having white particles displayed under these respective stripes of the color filter with black under the other two color stripes. Yellow may be derived by having black appear under the blue, and white under both the red and green. Cyan can be derived with white particles displayed under the green and blue stripes, with black under the red. Magenta may be displayed with white under the red and blue stripes of the color filter, and black under the green. White is displayed with white particles under all stripes of the color filter, and black is displayed with black under all of the color filters. Other colors may of course be shown if different color filter colors are selected.

Display Mediums

Next, various embodiments of the electrophoretic display mediums for use in the electrophoretic display device are described.

In embodiments, the display medium is comprised of at least one fluid and at least one, for example at least two, such as from two to ten or from two to four, set(s) of colored particles dispersed in the fluid.

In an embodiment herein, the display medium comprises one or more sets of colored particles dispersed in a fluid system. The fluid may be either clear/transparent, or it may exhibit a visible color, for example a different, contrasting color from the color(s) exhibited by the sets of particles dispersed therein. A colored fluid is typically used in a display employing a single set of colored particles, for example white particles, with the color of the fluid being a contrasting color other than white.

In embodiments, the fluid of the display medium and the set(s) of particles therein may have densities that are substantially matched, for example wherein the densities of these materials are within about 10% of each other, or more specifically within 5% of each other or within 2% of each other. In other embodiments, the fluid may comprise two immiscible fluids having different densities such that the first immiscible fluid having a density less than that of the second immiscible fluid rests on top of the second immiscible fluid, and each of the sets of particles has a density in between the densities of the two immiscible fluids such that the particles rest at an interface between the two immiscible fluids.

The fluid may comprise from about 10% to about 95% by weight of the display medium, for example from about 30% to about 90% or from about 40% to about 80% by weight of the display medium.

The fluid may be comprised of any suitable fluid known in the art for use in electrophoretic displays. Fluid refers to, for example, a material in a liquid state, and is not a gas or air. Of course, air or any other gas may also be present in the reservoirs of the display device, but the fluid of the display medium refers to a fluid in a liquid state. The choice of fluid may be based on concerns of chemical inertness, density matching to the particles to be suspended therein and/or chemical compatibility with the particles. In embodiments, the suspending fluid may have a low dielectric constant (for example, about 4 or less, such as about 0.5 to about 2). The viscosity of the fluid may be relatively low at the temperatures of operation in order to permit the particles to move therein, for example under the influence of an electrical field. In embodiments, the fluid may have a kinematic viscosity in the range of about 0.25 centistokes to about 10 centistokes, for example from about 0.5 centistokes to about 5 centistokes or from about 1 centistoke to about 2 centistokes, at about room temperature (about 23° C. to about 27° C.). The fluid may be dielectric and substantially free of ions. The fluid also may have minimum solvent action on the colored particles therein, and a specific gravity substantially equal to the colored particles, for example within about 10% of each other. Additionally, the fluid may be chosen to be a poor solvent for some polymers, which is advantageous for use in the fabrication of particles because it increases the range of polymeric materials useful in fabricating particles.

The fluid may include therein a thermally reversible gelling agent having a melting point temperature of at least about 35° C., for example as described in co-pending application Ser. No. 11/169,924, incorporated herein by reference in its entirety.

Organic solvents such as halogenated organic solvents, saturated linear or branched hydrocarbons, silicone oils, and low molecular weight halogen-containing polymers are a few suitable types of fluids that may be used. Organic solvents may include, for example, epoxides such as, for example, decane epoxide and dodecane epoxide, vinyl ethers such as, for example, cyclohexyl vinyl ether, and aromatic hydrocarbons such as, for example, toluene and naphthalene. Halogenated organic solvents may include, for example, tetrafluorodibromoethylene, tetrachloroethylene, trifluorochloroethylene, 1,2,4-trichlorobenzene, carbon tetrachloride, mixtures thereof and the like. These materials may have high densities. Hydrocarbons may include, for example, decane, dodecane, tetradecane, xylene, toluene, hexane, cyclohexane, benzene, the aliphatic hydrocarbons in the ISOPAR™ (Exxon), NORPAR™ (a series of normal paraffinic liquids from Exxon), SHELL-SOL™ (Shell), and SOL-TROL™ (Shell) series, naphtha, and other petroleum solvents. These materials may have low densities. Examples of silicone oils include octamethyl cyclosiloxane and higher molecular weight cyclic siloxanes, poly(methyl phenyl siloxane), hexamethyldisiloxane and polydimethylsiloxane. These materials may have low densities. Low molecular weight halogen-containing polymers may include, for example, poly(chlorotrifluoroethylene) polymer or KRYTOX™ polymers (Dupont).

Typically, hydrocarbon fluids such as ISOPAR M are used for electrophoretic ink applications due to their low cost, good dielectric strength, low volatility, and nonreactivity.

In embodiments, the aliphatic hydrocarbons may cause degradation of performance, for example when non-crosslinked emulsion aggregation particles are used as the colored particles of the display medium and/or when the colored particles are imparted with a charge by treatment with a surface coating that can be desorbed from the particle surface in the presence of an aliphatic hydrocarbon. Thus, it may be desirable to use as the fluid of the display medium a nonswelling fluid such as a silicone fluid. A commercially available silicone fluid includes DOW 200, a polydimethylsiloxane polymer available from Dow Corning. Other examples of suitable silicone fluids include polydimethylsiloxane fluids available from Gelest Corporation such as trimethylsiloxy terminated fluids DMS-T00, DMS-T01, DMS-T01.5, DMS-T02, DMS-T03, DMS-T05, DMS-T07, DMS-T11; cyclomethicones such as SIO6700.0, SID2650.0, SID4625.0 (also known as D4, D5, and D6 fluids, respectively); phenylmethylsiloxanes such as PMM-0011, PDM-7040; fluorosilicones such as SIB1816.0; polydiethylsiloxanes such as DES-T03, DES-T11; branched and low viscosity phenyltris(trimethylsiloxy)silane fluids such as SIP6827.0, phenethyltris(trimethylsiloxy)silane fluids such as SIP6722.8, and the like.

If colored, the fluid may be colored by any suitable means in the art, including through the inclusion of suitable dispersible colorants such as dyes and/or dispersible pigments therein.

In embodiments, the fluid is substantially free of charge control additives and other ionic species that may affect the charging behavior of the display medium and/or the particles dispersed therein. However, in other embodiments, the fluid may contain additives such as surface modifiers to modify the surface energy or charge of the particles and such as charge control agents, dispersants, and/or surfactants.

The display medium may be comprised of two immiscible liquids. Such a two-layer fluid system may be achieved using two fluids with differing densities and that are immiscible with each other. For example, 3M's fluoroether and Exxon's ISOPAR™ are a suitable combination of immiscible fluids. Fluoroether, being denser, rests on the bottom, while ISOPAR™, being less dense, rests on top. The particles of the display medium may have a density that is in between the densities of the two immiscible liquids so that they rest at the interface between the two layers.

Advantages of using two immiscible liquids may include that the rest position of the particles is at the interface of the two immiscible liquids (which may be near the middle portion of the reservoir) rather than at the bottom of the reservoir in which the display liquid is contained. This may avoid potential adhesion between the particles and the reservoir bottom. In addition, the switching time may be made faster because the particles only need to travel a portion of the distance of the reservoir in switching positions to display a different color to a viewer, and the particles rested at the interface may break loose more easily compared to particles resting at the bottom, which may increase particle stability and product life.

Various embodiments of particle sets to be dispersed in the fluid of the display medium are next described.

In embodiments, the display medium includes at least one set of particles exhibiting substantially the same color. The display medium may be comprised of one set of colored particles, including at least two, such as from two to ten or from two to four, sets of differently colored particles dispersed in the fluid. Color refers to, for example, the overall absorption characteristic within the range of wavelengths of the electromagnetic spectrum. Substantially the same color herein refers to, for example, particles exhibiting substantially the same hue and contrast (darkness/lightness) as other particles in the set. Colored particles of different sets of particles in the display medium exhibit a color, that is, an absorption characteristic, different from each other. For example, if a first set of particles exhibits a yellow color, then a second differently colored set of particles will exhibit a different shade (hue and/or contrast) of yellow or a different color altogether, for example such as cyan or magenta.

A display medium may include two sets of differently colored particles, for example black particles and white particles. In embodiments, the display medium comprises at least three differently colored sets of particles. As examples, the three sets of colored particles may comprise the three subtractive primary colors yellow, cyan and magenta, or may comprise red, blue and green. An example display medium containing four sets of differently colored particles may comprise yellow, cyan, magenta and black. Additional differently colored sets of particles, for example for highlight coloring, may be included as additional sets of colored particles in any embodiment described herein.

Each set of same colored particles in the display medium may comprise from about 5% to about 50% by weight, for example from about 5% to about 40% or from about 5% to about 30% by weight, of the display medium.

In embodiments, described is a low electrical conductivity electrophoretic display medium, for example having a conductivity on the order of about $10^{-11}$ to about $10^{-15}$ S/m, such as from about $10^{-12}$ to about $10^{-14}$ S/m or from about $10^{-12}$ to about $10^{-13}$ S/m. The conductivity of the display medium is thus comparable to that of the dielectric fluid. The particles of the display medium may become charged by the application of a high electric field thereto, which may also be referred to as field-induced or in situ charging, in which particle charging is dependent on, for example, the field strength and the charging time (or number of charging cycles). Following charging, the particles may have a charge (charge to mass ratio) on the order of microcoulombs (μC) per gram (that is, on the order of $10^{-6}$ C/g), such as from about ±0.1 to about ±20 μC/g, from about ±0.2 to about ±10 μC/g or from about ±0.3 to about ±5 μC/g.

In prior display mediums, the particles were typically charged by adding a charge control agent, which is capable of ionic dissociation, to the fluid during preparation of the non-aqueous ink dispersion. Dissociation of the charge control agent into positive and negative ionic species in the dielectric fluid results in preferential surface absorption of ions of one polarity by the particles, and the particles therefore become charged. The resulting dispersion contains a complex mixture of particles including charged particles, excess free ions and counter-ions. Due to the presence of excess free ions, the electrophoretic ink is also characterized by high electrical conductivity, which increases with concentration of the added charge control agent and is typically 100-1000 times higher compared with the dielectric fluid. High conductivity of the ink results in increased power consumption and may result in slower switching speed of the display. Moreover, the presence of excess free ions in the display medium makes it possible for many of the particles to switch to a wrong sign/polarity during collisions between particles in use, which may degrade image quality and response time.

The display medium, including the fluid and particle sets therein, of embodiments herein may thus be made to be substantially free of charge control additives and similar excess ionic species affecting the charging characteristics and/or conductivity of the display medium. Substantially free of ions herein refers, for example, to the display medium being free of ionic species to the extent that the aforementioned conductivity values may be achieved. As a result, the display medium herein is able to exhibit the aforementioned low conductivity properties.

As a result of the desired absence of charge control additives in the display medium, the particles of the sets of particles of the display medium need to be made to include a capability of exhibiting the low charging property by other methods. Such may be accomplished, for example, by the formation of the particles in the presence of a surfactant and/or water, wherein small amounts of these materials may be incorporated into the particles during formation. Other components that could impart the charge to the particles include polymerization initiators such as APS (ammonium persulfate), chain transfer agents such as DDT (dodecylthiol), or acidic/basic functional groups in the polymer backbone that may be exposed or partially exposed on the particle surface. These materials may act as charge species in the particles, imparting an almost negligible charge at time zero but that which enables the particles to be charged, for example through application of a high electric field as will be described more fully below, to the low charge values described above. These materials are part of the particles and substantially do not become dissociated in the display medium, thereby enabling the display medium to maintain the low conductivity. Moreover, unlike prior systems requiring the presence of ionic species in the medium that permit the display to degrade in performance over time, for example through the generation of wrong sign particles and/or loss of sufficient ionic species in the medium, the particles herein do not generate ionic species and do not require the presence of ionic species for charging, and thus are not subject to such degradation risks.

As the particles of the display medium, any particle made by any suitable process may be used, so long as the particles are capable of exhibiting the low charge property discussed above. Thus, particles made by both physical grinding methods, in which the material of the particles is formed as a mass that is then crushed and ground to the desired average particle size, and chemical build-up methods, in which the particles are grown individually within a reaction medium to the desired average particle size, both of which types of methods are well known in the toner art, may be used. The particles nay be made to have an average size of from, for example, about 5 nm to about 100 μm, such as from about 10 nm to about 50 μm or from about 0.5 μm to about 25 μm.

The particles typically have a size less than the size of the reservoirs of the display device in which the display medium will be contained so that the particles are free to move within the reservoirs.

The particles may be neat pigments, dyed (laked) pigments, pigment/polymer composites, dyed or pigmented agglomerated polymer particles and the like. As the colorant of the particles, dyes, pigment, mixtures of dyes, mixtures of pigments or mixtures of dyes and pigments may be used. Particles and/or colorant of particles may also include laked, or dyed, pigments, in which a dye is precipitated on the particles or the particles are stained with a dye such as metal salts of readily soluble anionic dyes, for example dyes of azo, triphenylmethane or anthraquinone structure containing one or more sulphonic or carboxylic acid groupings precipitated by a calcium, barium or aluminum salt.

Typical manufacturing techniques for the above particles are drawn from the liquid toner and other arts and include ball milling, attrition, jet milling, and the like. A pigmented polymer particle may be made by, for example, compounding a pigment in the polymer. The composite material is then (wet or dry) ground to a desired size. It may then optionally be added to a carrier liquid and milled under high shear for several hours to a final particle size and/or size distribution.

Chemical processes that may be used in forming the particles include, for example, emulsion aggregation, dispersion polymerization, mini- or micro-emulsion polymerization, suspension polymerization, precipitation, phase separation, solvent evaporation, in situ polymerization, or any process of microencapsulation.

Polymers that may be used for the pigmented particles include, for example, polystyrene, polyethylene, polypropylene, phenolic resins, ethylene-vinyl acetate copolymers, polyesters, polyacrylates, polymethacrylates, ethylene acrylic acid or methacrylic acid copolymers, acrylic copolymers and terpolymers and the like. Specific example include, for example, polyethylene, polypropylene, polymethylmethacrylate, polyisobutylmethacrylate, polystyrene, polybutadiene, polyisoprene, polyisobutylene, polylauryl methacrylate, polystearyl methacrylate, polyisobornyl, methacrylate, poly-t-butyl methacrylate, polyethyl methacrylate, polymethyl acrylate, polyethyl acrylate, polyacrylonitrile, and copolymers of two or more of these materials.

While pigment/polymer composite particles, for example composite particles created by a physical-chemical process such as grinding/attrition of pigment/polymer or by surface treatment/grafting of stabilizing polymeric groups on the surface, may be used herein, such composite particles may have polydisperse particles that exhibit variable charging characteristics. Thus, in embodiments, the particles for the display medium are emulsion aggregation particles, for example including polyester resin based emulsion aggregation particles and styrene-acrylate or acrylate resin based emulsion aggregation particles. Such particles are chemically grown and tend to be substantially monodisperse in size and substantially spherical in shape. Another advantage to emulsion aggregation particles is that the particle surface is substantially completely passivated by the binder resin, which may eliminate the contribution of the colorant, such as pigment, to the particle charge.

Examples of suitable polyester resins for the emulsion aggregation particles include polyethylene terephthalate, polypropylene terephthalate, polybutylene terephthalate, polypentylene terephthalate, polyhexylene terephthalate, polyheptadene terephthalate, polyoctalene terephthalate, polyethylene sebacate, polypropylene sebacate, polybutylene sebacate, polyethylene adipate, polypropylene adipate, polybutylene adipate, polypentylene adipate, polyhexalene adipate, polyheptadene adipate, polyoctalene adipate, polyethylene glutarate, polypropylene glutarate, polybutylene glutarate, polypentylene glutarate, polyhexylene glutarate, polyheptadene glutarate, polyoctalene glutarate polyethylene pimelate, polypropylene pimelate, polybutylene pimelate, polypentylene pimelate, polyhexylene pimelate, polyheptadene pimelate, poly(propoxylated bisphenol fumarate), poly(propoxylated bisphenol succinate), poly(propoxylated bisphenol adipate), poly(propoxylated bisphenol glutarate), mixtures, copolymers or combinations thereof, and the like.

Polyester toner particles, formed by the emulsion aggregation process, are illustrated in a number of patents, such as U.S. Pat. No. 5,593,807, U.S. Pat. No. 5,290,654. U.S. Pat. No. 5,308,734, and U.S. Pat. No. 5,370,963, each of which is incorporated herein by reference in their entirety. Further examples of suitable polyester particles include those having lithium and/or sodium sulfonated polyester resin as disclosed in a number of patents, such as U.S. Pat. Nos. 6,387,581 and 6,395,445, each of which is incorporated herein by reference in their entirety. The polyester may comprise any of the polyester materials described in the aforementioned references.

An example process for preparing the polyester based emulsion aggregation particles may comprise charging a polyester resin emulsion, for example an aqueous based emulsion optionally containing one or more surfactants, into a reactor, and adding a colorant to the reactor while stirring. A wax dispersion may optionally be added. The mixture is stirred and heated to a desired temperature, for example from about 40° C. to about 70° C., such as from about 45° C. to about 70° C. or from about 40° C. to about 65° C. A solution of an aggregating agent is pumped into the mixture to initiate growth/aggregation of the polyester particles. An additional amount of resin emulsion may then be added, where it is desired to form a shell that is substantially free of coloring agent such as dyes, pigments or mixtures thereof on the core aggregated colored particles. The temperature of the reactor may then be raised towards the end of the reaction to, for example, from about 45° C. to about 75° C., such as from about 50° C. to about 75° C. or from about 45° C. to about 70° C., to allow for appropriate spherodization and coalescence to achieve the desired average particle size and shape. The slurry may be cooled, washed and dried.

Examples of suitable acrylate resin binders for the emulsion aggregation particles include, for example, polymers such as poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid); the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), and poly(styrene-butyl acrylate-acrylonitrile-acrylic acid).

Acrylate toner particles created by the emulsion aggregation process are illustrated in a number of patents, such as U.S. Pat. No. 5,278,020, U.S. Pat. No. 5,346,797, U.S. Pat. No. 5,344,738, U.S. Pat. No. 5,403,693, U.S. Pat. No. 5,418,108, and U.S. Pat. No. 5,364,729, each of which is incorporated herein by reference in their entirety. The acrylate may comprise any of the materials described in the aforementioned references. In embodiments, the acrylate polymer may be a styrene-acrylate copolymer, such as styrene-butyl acrylate that may also be comprised of β-carboxyethylacrylate.

Thus, the binder may be specifically comprised of a styrene-alkyl acrylate, for example a styrene-butyl acrylate copolymer resin, or a styrene-butyl acylate-β-carboxyethyl acrylate polymer resin.

The monomers used in making the acrylate polymer binder may include any one or more of, for example, styrene, acrylates such as methacrylates, butylacrylates, β-carboxyethyl acrylate (β-CEA), etc., butadiene, isoprene, acrylic acid, methacrylic acid, itaconic acid, acrylonitrile, benzenes such as divinylbenzene, etc., and the like. Known chain transfer agents can be utilized to control the molecular weight properties of the polymer. Examples of chain transfer agents include dodecanethiol, dodecylmercaptan, octanethiol, carbon tetrabromide, carbon tetrachloride, and the like in various suitable amounts, for example of about 0.1 to about 10 percent by weight of monomer, and preferably of about 0.2 to about 5 percent by weight of monomer. Also, crosslinking agents such as decanedioldiacrylate or divinyl benzene may be included in the monomer system in order to obtain higher molecular weight polymers, for example in an effective amount of about 0.01 percent by weight to about 25 percent by weight, preferably of about 0.5 to about 10 percent by weight.

An example method for making acrylate based emulsion aggregation particles may include first mixing resin emulsion, for example an aqueous based emulsion optionally containing one or more surfactants, a colorant, and a coagulating agent at a temperature at or above the glass transition temperature (Tg) of the resin, such as 5° C. to about 50° C. above the Tg of the resin, which Tg is usually in the range of from about 50° C. to about 80° C. or is in the range of from about 52° C. to about 65° C. The particles are permitted to grow or aggregate to a desired size. An outer shell material for the aggregated particles, for example consisting essentially of binder resin that is substantially free of coloring agent such as dyes, pigments or mixtures thereof on the core aggregated colored particles, may then be added, for example to form a shell on the aggregated particles having a thickness of about 0.1 to about 2 micron. The aggregation is then halted, for example with the addition of a base. The particles may then be coalesced, for example at an elevated temperature such as from about 60° C. to about 98° C., until a suitable shape and morphology is obtained. Particles are then optionally subjected to further processing, for example wet sieved, washed by filtration, and/or dried.

As surfactants for use in making emulsion aggregation particles as discussed above, examples include anionic, cationic, nonionic surfactants and the like.

Anionic surfactants include sodium dodecylsulfate (SDS), sodium dodecyl benzene sulfonate, sodium dodecylnaphthalene sulfate, dialkyl benzenealkyl, sulfates and sulfonates, abitic acid, and the NEOGEN brand of anionic surfactants. NEOGEN R-K available from Daiichi Kogyo Seiyaku Co. Ltd. (Japan), or Tayca Power BN2060 from Tayca Corporation (Japan) consist primarily of branched sodium dodecyl benzene sulphonate.

Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride), available from Kao Chemicals, and the like. SANISOL, B-50 consists primarily of benzyl dimethyl alkonium chloride.

Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulene Inc. as IGEPAL CA-210, IGEPAL CA-520, IGEPAL CA-720, IGEPAL, CO-890, IGEPAL CO-720, IGEPAL CO-290, IGEPAL CA-210, ANTAROX 890 and ANTAROX 897. ANTAROX 897 consists primarily of alkyl phenol ethoxylate.

The toner preparation is typically carried out in an aqueous (water) environment as detailed above, and the electrophoretic ink is an non-aqueous environment (oil). When the toner is prepared, it is given a final water wash to remove excess surfactant. Trace amounts of residual surfactant on the surface of the toner particle, or trapped within the particle itself, may remain and contribute to the low conductivity of the particles. However, the amount of surfactant that actually gets into the oil is very low, since it prefers to be in water. As a result, the fluid medium has a desired low conductivity.

In embodiments, the emulsion aggregation particles are made to have an average particle size of from about 0.5 to about 25 μm, for example about 5 to about 15 μm or about 5 to about 12 μm. The particle size may be determined using any suitable device, for example a conventional Coulter counter.

The emulsion aggregation particles also may have a substantially monodisperse size such that the upper geometric standard deviation (GSD) by volume for (D84/D50) is in the range of from about 1.1 to about 1.25. The particle diameters at which a cumulative percentage of 50% of the total toner particles are attained are defined as volume D50, and the particle diameters at which a cumulative percentage of 84% are attained are defined as volume D84. These aforementioned volume average particle size distribution indexes GSDv can be expressed by using D50 and D84 in cumulative distribution, wherein the volume average particle size distribution index GSDv is expressed as (volume D84/volume D50). The upper GSDv value for the toner particles indicates that the toner particles are made to have a very narrow particle size distribution.

The emulsion aggregation particles also may be made to be highly circular, thereby exhibiting better flow properties with respect to movement within the display medium. In other words, rounder/smoother particles have a higher electrophoretic mobility, and thus a faster response time within the display. The circularity is a measure of the particles closeness to a perfect sphere. A circularity of 1 identifies a particle having the shape of a perfect circular sphere. The emulsion aggregation particles may have an average circularity of about 0.92 to about 0.99, for example from about 0.94 to about 0.98 or from about 0.95 to about 0.97. The circularity may be determined using the known Malvern Sysmex Flow Particle Image Analyzer FPIA-2100.

In embodiments, the binder of the particles is comprised of a mixture of two binder materials of differing molecular weights, such that the binder has a bimodal molecular weight distribution (that is, with molecular weight peaks at least at two different molecular weight regions). For example, the binder may be comprised of a first lower molecular weight binder, for example a non-crosslinked binder, and a second high molecular weight binder, for example a crosslinked binder. The first binder may have a number average molecular weight (Mn), as measured by gel permeation chromatography (GPC), of from, for example, about 1,000 to about 30,000, and more specifically from about 5,000 to about 15,000, a weight average molecular weight (Mw) of from, for example, about 1,000 to about 75,000, and more specifically from about 25,000 to about 40,000, and a glass transition temperature of from, for example, about 40° C. to about 75° C. The second binder may have a substantially greater number average and weight average molecular weight, for example over 1,000,000 for Mw and Mn, and a glass transition temperature of from, for example, about 35° C. to about 75° C. The glass transition temperature may be controlled, for example, by adjusting the amount of acrylate in the binder. For example, a higher acrylate content can reduce the glass transition temperature of the binder. The second binder may be referred to as a gel, which is a highly crosslinked polymer, due to the extensive gelation and high molecular weight of the latex. In this embodiment, the gel binder may be present in an amount of from about 0% to about 50% by weight of the total binder, preferably from about 8% to about 35% by weight of the total binder.

The first, lower molecular weight binder may be selected from among any of the aforementioned polymer binder materials. The second gel binder may be the same as or different from the first binder. For example, for acrylate binders, the second gel binder may be comprised of highly crosslinked materials such as poly(styrene-alkyl acrylate), poly(styrene-butadiene), poly(styrene-isoprene), poly(styrene-alkyl methacrylate), poly(styrene-alkyl acrylate-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrileacrylic acid), and poly(alkyl acrylate-acrylonitrile-acrylic acid), and/or mixtures thereof. In embodiments, the gel binder is the same as the first binder, and both are a styrene acrylate, for example a styrene-butyl acrylate or styrene-butyl acrylate of styrene-butyl acrylate-β-carboxy ethyl acrylate. The higher molecular weight of the second gel binder may be achieved by, for example, including greater amounts of styrene in the monomer system, including greater amounts of crosslinking agent in the monomer system and/or including lesser amounts of chain transfer agents.

In still further embodiments, the emulsion aggregation particles have a core-shell structure. In this embodiment, the core is comprised of the particle materials discussed above, including at least the binder and the colorant. Once the core particle is formed and aggregated to a desired size, a thin outer shell is then formed upon the core particle. The shell may be comprised of only binder material, although other components may be included therein if desired. The shell may be comprised of a latex resin that is the same as a latex of the core particle. The shell latex may be added to the core aggregates in an amount of about 5 to about 40 percent by weight of the total binder materials, for example in an amount of about 5 to about 30 percent by weight of the total binder materials. The shell or coating on the aggregates may have a thickness wherein the thickness of the shell is about 0.2 to about 1.5 µm, for example about 0.3 to about 1.2 µm or from about 0.5 to about 1 µm.

The total amount of binder, including core and shell if present, may be in the range of from about 60 to about 95% by weight of the emulsion aggregation particles (toner particles exclusive of external additives) on a solids basis, for example from about 70 to about 90% by weight of the particles.

The particles may also be made by emulsion aggregation starting from seed particles derived via a stable free-radical polymerization method. Such stable free-radical polymerization (SFRP) processes are known in the art, for example as described in U.S. Pat. No. 5,322,912, the entire disclosure of which is totally incorporated herein by reference. In the SFRP processes, propagating chains of the polymer are referred to as "pseudo-living" because the stable free-radical agent adds to a propagating chain and the chain is temporarily, but reversibly, terminated. This allows for the formation of block copolymers that can incorporate monomers that will enhance the particle charge. The monomers due to this block character can be at the particle surface (especially if they are formed from hydrophilic monomers) and thus the charge of the particle will be enhanced. Such monomers can be amines such as aminoethylacrylate or methacrylate, sulfonates such as styrenesulfonates, acids such as β-carboxyethylacrylate or methacrylate, or any heteroatom monomers that can be ionized or quaternized. The resultant polymers of SFRP are dispersed in an aqueous phase to form the starting latex of the emulsion aggregation processes discussed above. Thus, SFRP may be used to form any of the polymers described above as binders for the emulsion aggregation particles.

In addition to the polymer binder and the colorant, the particles may also contain a wax dispersion. Linear polyethylene waxes such as the POLYWAX®, line of waxes available from Baker Petrolite are useful. Of course, the wax dispersion may also comprise polypropylene waxes, other waxes known in the art, including carnauba wax and the like, and mixtures of waxes. The toners may contain from, for example, about 1 to about 15% by weight of the particles, on a solids basis, of the wax, for example from about 3 to about 12% or from about 5 to about 10% by weight.

In addition, the colored particles may also optionally contain a coagulant and/or a flow agent such as colloidal silica. Suitable optional coagulants include any coagulant known or used in the art, including the well known coagulants polyaluminum chloride (PAC) and/or polyaluminum sulfosilicate (PASS). The coagulant is present in the toner particles, exclusive of external additives and on a dry weight basis, in amounts of from 0 to about 3% by weight of the toner particles, for example from about greater than 0 to about 2% by weight of the toner particles. The flow agent, if present, may be any colloidal silica such as SNOWTEX OL/OS colloidal silica. The colloidal silica is present in the toner particles, exclusive of external additives and on a dry weight basis, in amounts of from 0 to about 15% by weight of the toner particles, for example from about greater than 0 to about 10% by weight of the toner particles.

Although not required, the toner may also include additional known positive or negative charge additives in effective suitable amounts of, for example, from about 0.1 to about 5 weight percent of the toner, such as quaternary ammonium compounds inclusive of alkyl pyridinium halides, bisulfates, organic sulfate and sulfonate compositions such as disclosed in U.S. Pat. No. 4,338,390, cetyl pyridinium tetrafluoroborates, distearyl dimethyl ammonium methyl sulfate, aluminum salts or complexes, and the like.

In embodiments, one or more sets of the colored particles incorporated into the display medium comprise crosslinked emulsion aggregation particles. The crosslinking may be achieved by any suitable method, including, for example, thermal curing or radiation, for example UV, curing. Crosslinked refers to, for example, the high molecular weight state achieved by including crosslinkable monomer or oligomer additives in a composition along with an initiator and exposing the composition to a curing environment (for example, elevated temperature for thermal curing or UV light for radiation curing) to effect curing of the additives. Other components of the composition, for example the other binder resin components, may also participate in the crosslinking.

Gel content may be used to define the extent of crosslinking in the particles. The crosslinking forms a gel portion that has significantly increased strength and less solvent solubility with respect to the individual polymer chains. Gel content refers to the proportion of the polymer chains of the polymer particles that have been crosslinked, thereby constituting a part of the gel network. In embodiments, the particles may have a gel content from about 10 percent to about 100 percent, for example from about 20 to about 80 percent or from about 25 to about 75 percent.

The gel content of the polymer particles is quantitatively measured, for example by continuously extracting, for example by soxhlet extraction, the reaction product after crosslinking processing is complete, by which the weight of the crosslinked polymer material can be obtained. A continuous extraction method allows polymers that are soluble to be removed from the mass of crosslinked polymer that typically is not soluble in most or any solvents. Accordingly, the use of a solvent in which the polymer is soluble, and in which the crosslinked portions are insoluble, is used for the procedure. By dividing the weight of the crosslinked polymer material by the total weight of the material that was continuously extracted, and multiplying by 100, the gel content value may be obtained. The degree of crosslinking may be regulated by controlling the time and/or intensity of the crosslinking procedure, and/or by the concentration of the crosslinkable materials in the particles.

As was discussed above, hydrocarbon fluids such as ISOPAR M are a desirable fluid to use for an electrophoretic display medium. However, using such a fluid system with emulsion aggregation particle sets may result in device degradation, for example as a result of the fluid causing swelling of the emulsion aggregation resin and leaching out of the component materials such as wax, surface treatment reagents, etc., from the swollen particles.

Crosslinkable particles may be prepared by including in the binder one or more crosslinking additives. After the emulsion aggregation particle formation process described above, the toner particles are subjected to a radiation curing step, for example comprising UV radiation, to effect the crosslinking process, resulting in a robust particle with excellent resistance to solvent swelling, and also having enhanced resistance to softening/melting at elevated temperatures.

The crosslinking additives may be added to any type of emulsion aggregation resin binder to permit the particles made therefrom to be UV crosslinkable. The one or more crosslinking additives thus may be included in either acrylate or polyester type emulsion aggregation resins. The additive may be present in an amount of from, for example, about 0.5 to about 50% by weight, for example from about 0.5 to about 25% by weight or from about 1 to about 20% by weight of the total binder in the particles.

Examples of the crosslinking additives include multifunctional acrylates such as diacrylates, triacrylates, tetraacrylates, and the like. For example, the multifunctional acrylate monomer or oligomer, may include diacrylates such as propoxylated neopentyl glycol diacrylate (available from Atofina as Sartomer SR 9003), 1,6-hexanediol diacrylate (Sartomer SR 238), tripropylene glycol diacrylate, dipropylene glycol diacrylate, aliphatic diacrylate oligomer (CN 132 from Atofina), aliphatic urethane diacrylate (CN 981 from Atofina), aromatic urethane diacrylate (CN 976 from Atofina) and the like, triacrylate or higher functionality monomers or oligomers such as amine modified polyether acrylates (available as PO 83 F, LR 8869, and/or LR 8889 from BASF Corporation), trimethylol propane triacrylate (Sartomer SR 351), tris (2-hydroxy ethyl) isocyanurate triacrylate (Sartomer SR 368), aromatic urethane triacrylate (CN 970 from Atofina), dipentaerythritol penta-/hexa-acrylate, pentaerythritol tetraacrylate (Sartomer SR 295), ethoxylated pentaerythritol tetraacrylate (Sartomer SR 494), dipentaerythritol pentaacrylate (Sartomer SR 399) and the like, or mixtures of any of the foregoing. Additional examples of suitable crosslinking additives include chlorinated polyester acrylate (Sartomer CN 2100), amine modified epoxy acrylate (Sartomer CN 2100), aromatic urethane acrylate (Sartomer CN 2901), and polyurethane acrylate (Laromer LR 8949 from BASF). Other unsaturated curable resins that may be used are described in U.S. Patent Publication No. 2005/0137278 A1, which is herein incorporated by reference in its entirety.

A crosslinking initiator is also included in the crosslinking additives. Photoinitiators such as 2,4,6-trimethylbenzoyl-diphenylphosphine oxide (available as BASF Lucirin TPO), 2,4,6-trimethylbenzoylethoxyphenylphosphine oxide (available as BASF Lucirin TPO-L), bis(2,4,6-trimethylbenzoyl)-phenyl-phosphine oxide (available as Ciba IRGACURE 819) and other acyl phosphines, 2-benzyl 2-dimethylamino 1-(4-morpholinophenyl) butanone-1 (available as Ciba IRGACURE 369), titanocenes, and isopropylthioxanthone, 1-hydroxy-cyclohexylphenylketone, benzophenone, 2,4,6-trimethylbenzophenone, 4-methylbenzophenone, 2-methyl-1-(4-methylthio)phenyl-2-(4-morphorlinyl)-1-propanone, diphenyl-(2,4,6-trimethylbenzoyl) phosphine oxide, 2,4,6-trimethylbenzoylphenylphosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethylketal, and mixtures thereof may be used. Amine synergists, for example such as ethyl-4-dimethylaminobenzoate and 2-ethylhexyl-4-dimethylamino benzoate, may also be used. This list is not exhaustive, and any known photoinitiator that initiates the free radical reaction upon exposure to a desired wavelength of radiation such as UV light can be used.

The total amount of photoinitiator included in the particles with respect to the radically curable component may be from, for example, about 0.5 to about 20%, for example preferably from about 1 to about 15% or from about 1 to about 10%, by weight.

In making the crosslinkable particles, the particles may be made the same as any of the aforementioned emulsion aggregation methods, with the modification that the one or more crosslinking additives and photoinitiators is included in the emulsion. The particles are then aggregated and/or coalesced as normal. Following completion of the particle formation, the particles may then be subjected to radiation such as thermal or UV radiation to initiate and effect the crosslinking. Following radiation curing, the particles still have substantially the same size and shape, but are crosslinked and thus much more resistant to solvents and to melting at higher temperatures.

In embodiments, one or more sets of the colored particles incorporated into the display medium comprise emulsion aggregation particles derived from polymers having maleic anhydride and/or maleic acid functionality incorporated into the resin. In the presence of water, the maleic anhydride groups are hydrolyzed to carboxylic acid groups (maleic acid). Depending on the mode of preparing the polymer resin used to make the particles, the degree of hydrolysis of the maleic anhydride groups can be altered. In the emulsion aggregation process, the introduced acid groups permit aggregation into larger particles as well as impart a substantially uniform negative charge to the particles. In other words, in emulsion aggregation processes, the acid functionality is used as an aggregation/coalescence site permitting larger size particles to be grown from the polymer latex. Moreover, it is believed that the acid functionality, for example carboxylic (COOH) acid functionality, may impart the substantially uniform negative charge to the particles.

An advantage in the use of these particles is that the negative charge of the particles is substantially uniform among the particles of the set. Substantially uniform charge among the particles of a same colored set of particles refers to, for example, a charge distribution such that the charge among any two given particles of the set is within about 20%, such as within about 10%, of each other. As a result, the electrophoretic mobility of all of the particles in the set is substantially the same, allowing the particles in the set to have a substantially same response time upon application of an electric field. Ensuring a substantially uniform charge, and thus a substantially uniform mobility and response time upon application of an electric field is advantageous to avoid unintended mixing of one set of colored particles with a differently colored set of particles, for example because some of the particles of the colored set did not adequately respond to the electric field and permitted differently colored particles of a different set to integrate into the set of colored particles. Color degradation of the intended image could result from a lack of uniformity in charge among particles of the set.

The formation of polymers having maleic anhydride functionality is described in U.S. Pat. No. 7,009,011, which is incorporated herein by reference in its entirety. Specifically, any of the polymers/donor monomers, free radical initiators, stable free radical agents, optional additives or other components described in the above-identified application may be suitably used herein. Example polymers/donor monomers that may be made to include maleic anhydride functionality include, for example, styrene, butyl acrylate, carboxy ethyl acrylate, mixtures thereof, and the like.

The maleic anhydride functionality may be incorporated into the polymer at any stage of making the polymer, and the degree of conversion to the maleic acid can also be altered by the mode of preparation. For example, the maleic anhydride functionality may be introduced into the polymer at a bulk polymerization step, or at the latex formation step, which latex is used in the subsequent formation of the particles, for example by emulsion polymerization, and the like. In bulk polymerization, the procedure is carried out in the absence of water, and the maleic anhydride functionality is left intact. When this resin is emulsified into a latex, only the surface maleic anhydride groups are converted to the acid form. Conversely, when the maleic anhydride functionality is added to a waterborne polymer latex, all of the maleic anhydride groups are hydrolyzed to the acid form. The particles may be made by emulsion polymerization and the like, using the maleic anhydride functional polymer latex mentioned above as a starting latex, via any of the emulsion aggregation procedures discussed above.

In emulsion aggregation processes, aggregation is conducted using latex(es) in an aqueous medium. As a result, acid functionality, for example carboxylic acid groups, is imparted to the particles because in maleic anhydride hydrolyzes in the aqueous medium. Excess acid functionality not necessary for the aggregation procedure may provide the negative charge exhibited by the particles.

In embodiments, one or more sets, for example one to ten, such as one to four or two to four sets, of the colored particles incorporated into the display medium comprise particles, for example emulsion aggregation particles such as emulsion aggregation polyester or emulsion aggregation acrylate particles, surface treated with a cationic polymer that imparts a substantially uniform positive charge to the particles of the particles set. Thus, an advantage in the use of these particles is that the positive charge of the particles is substantially uniform among the particles of the set. Substantially uniform charge among the particles of a same colored set of particles refers to, for example, a charge distribution such that the charge among any two different particles of the set is within about 20%, such as within about 10%, of each other. As a result, the electrophoretic mobility of all of the particles in the set is substantially the same, allowing the particles in the set to have a substantially same response time upon application of an electric field. Ensuring a substantially uniform charge, and thus a substantially uniform mobility and response time upon application of an electric field, is advantageous to avoid unintended mixing of one set of colored particles with a differently colored set of particles, for example because some of the particles of the colored set did not adequately respond to the electric field and permitted differently colored particles of a different set to integrate into the set of colored particles. Color degradation of the intended image could result from a lack of uniformity in charge among particles of the set.

In embodiments, the cationic polymer is a methacrylate polymer or copolymer, for example an aminomethacrylate polymer such as EUDRAGIT EPO (Rohm America), that imparts a positive charge to the particles. Other examples of specific cationic polymers that may be selected are EUDRAGIT RL and RS (Rohm Pharma), which are copolymers synthesized from acrylic and methacrylic esters with a low content of quaternary ammonium groups. EUDRAGIT RL and RS differ in the molar ratios of the ammonium groups to the remaining neutral (meth)acrylic acid esters (1:20 and 1:40, respectively). EUDRAGIT NE is an aqueous dispersion of a neutral copolymer based on ethyl acrylate and methyl methacrylate. EUDRAGIT RD 100 is a powder form of copolymers of acrylates and methacrylates with a quaternary ammonium group in combination with sodium carboxymethylcellulose. Another cationic polymer is EUDRAGIT RTM E (Rohm America), which is a copolymer of dimethylaminoethylmethacrylate and neutral methacrylic esters.

By varying the concentration of the cationic polymer used, the degree of charging can be varied. For example, lower concentration of cationic polymer means less positive charge on the particles. By creating a substantially uniform coating of the cationic polymer on the particles, a consistent surface charge can be attained, and particle mobility is the same for all particles. Macroscopically, the toner particles all appear to move at once, giving a faster, cleaner color transition.

The EUDRAGIT methacrylate polymers such as EUDRAGIT EPO are cationic, and are pH dependent and soluble in solutions up to pH 5. The particles of the colored particle set may thus be surface treated with the cationic polymer by adding the cationic polymer in its dissolved form to an acidified slurry of the particles. The pH is then slowly increased to above 5, for example to about 7 to about 2 such as about 10 to about 12, so that the cationic polymer precipitates on the surface of the particles. The cationic polymer is believed to surface treat the particles by forming a film around the particle's surface upon the evaporation of water. The surface of the treated particles acquires the cationic characteristics of the cationic polymer, resulting in a positive charged toner.

In further embodiments, one or more sets, for example one to ten, such as one to four or two to four sets, of the colored particles incorporated into the display medium comprise particles, for example emulsion aggregation particles such as emulsion aggregation polyester or emulsion aggregation acrylate particles having deposited thereon multiple layers of alternating cationic and anionic layers that impart either a substantially uniform positive charge or a substantially uniform, negative charge, depending on the surface layer of the multi-layer coating, to the particles of the particle set. For example, where the surface layer of the multi-layer coating is a cationic material, the particles will exhibit a substantially uniform positive charge, and where the surface layer of the multi-layer coating is an anionic material, the particles will exhibit a substantially uniform negative charge.

As was discussed above, when emulsion aggregation particles are made, such particles will typically include anionic groups on the surfaces thereof, for example carboxylic acid groups or sodio-sulfonate groups inherited from excess surfactant used in the process, inherited from the latex resin, and the like. Emulsion aggregation particles thus typically possess the negative charge discussed above, and exhibit a negative electrophoretic mobility in water and in dielectric fluid. This charge, while desirable and suitable for the use of the particles in an electrophoretic display as described above, may be non-uniform. However, the presence of anionic groups on the surfaces of the particles provides sites for additional cationic and anionic materials to be built up on the particles, and this property can be advantageously used to provide a more uniform charge among the particles.

For example, the anionic groups on the particle surface enable an ionic exchange between mobile cations on the surface with a cationic material. The result is the formation of a substantially uniform nanoscale coating around the toner particle surface, which coating imparts a positive charge to the particles.

Moreover, as the cationic and anionic materials, polyelectrolyte materials may be used. In this manner, alternating layers of cationic and anionic materials may be built up. That is, following formation of a layer of cationic polyelectrolyte, ionic exchange may then be conducted between the ionic species of the surface cationic polyelectrolyte and an anionic polyelectrolyte to deposit a uniform nanoscale anionic coating on the surface, which coating imparts a negative charge to the particles.

The deposition process is conducted in an aqueous solution, which process is therefore very compatible with the emulsion aggregation particle formation processes discussed above.

It is desirable to deposit multiple alternating layers of the cationic and anionic polyelectrolyte materials. For example, the coating may contain from 2 to about 20 total layers, such as from 2 to about 10 or from 2 to about 8 total layers. Each layer is approximately nanoscale in thickness, having a thickness of from about 0.1 to about 30 nm, for example from about 0.5 to about 10 nm or from about 1 to about 3 nm. Deposition of alternating layers enables complete coverage of the particles, which may not occur with only a single layer deposition. This enables the particles to have a more uniform charge density.

In general, the zeta potential (mV) achieved through deposition of polyelectrolytes may vary from about 5 to about 100 mV, for example from about 5 to about 75 mV or about 10 to about 50 mV, for cationic polyelectrolyte surface layers, and from about −5 to about −120 mV, for example between about −5 to about −100 mV or about −10 to about −80 mV, for anionic polyelectrolyte surface layers. In general, each particle dispersed in a solution is surrounded by oppositely charged ions typically referred to as a fixed layer. Outside the fixed layer, there are varying compositions of ions of opposite polarities, forming a cloud-like area, typically referred to as a diffuse double layer, and the whole area is electrically neutral. When a voltage is applied to the solution in which the particles are dispersed, particles are attracted to the electrode of the opposite polarity, accompanied by the fixed layer and part of the diffuse double layer, or internal side of a "sliding surface." Zeta potential is considered to be the electric potential of this inner area including this "sliding surface." As this electric potential approaches zero, particles tend to aggregate.

The deposition of multiple alternating layers also enables the creation of different charge densities among different colored particle sets. For example, a first particle set having a multi-layer coating in which each layer is comprised of the same cationic and anionic polyelectrolytes will exhibit a certain charge density, whereas a similar particle set in which one or more layers of the multi-layer coating use a cationic polyelectrolyte or an anionic polyelectrolyte different than the other polyelectrolytes of the multi-layer coating can exhibit a charge density different from the first particle set. The use of different polyelectrolytes in a multi-layer coating thus enables different charge densities to be achieved among different particle sets. This permits different particle sets to be used in a same display medium and to be controlled differently in view of the different charge densities possessed by the different particle sets. Of course, in a similar manner, different charge densities among different particle sets may also be achieved through the use of entirely different cationic polyelectrolytes and/or anionic polyelectrolytes in the making of the different multi-layer coatings of the different particle sets.

In embodiments, although it is necessary to use a polyelectrolyte to build up the multiple layer coating, it is not necessary to use a polyelectrolyte as the surface layer of the coating. A cationic or anionic non-polyelectrolyte, for example a cationic polymer as discussed above, may be used as the surface layer of the coating.

As the cationic polyelectrolyte, any suitable polyelectrolyte may be used. Polyelectrolyte refers to, for example, any chemical compound capable of ionizing when dissolved. Specific examples of cationic polyelectrolytes include poly (diallyldimethylammonium) (PDAD) chloride:

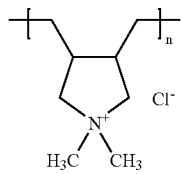

wherein n is from, for example, about 100 to about 8,000 such as from about 500 to about 5,000 (PDAD(Cl) may have a weight average molecular weight of from about 50,000 to about 500,000), poly(allylamine) hydrogenchloride ((PAH) Cl):

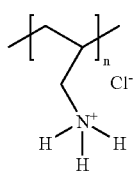

wherein n is from, for example, about 10 to about 5,000 such as from about 100 to about 1,000 (PAH(Cl) may have a weight average molecular weight of about 10,000 to about 100,000), and polyethyleneimine:

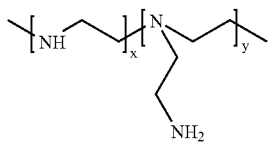

wherein x and y may each independently be from 1 to about 1,000 such as from 1 to about 500 (polyethyleneimine may have a weight average molecular weight of about 200 to about 50,000). Other variants of polyethyleneimine can be used, such as:

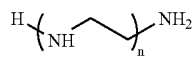

or $C_6H_{21}N_5$, a mixture of linear and branched chains, with a weight average molecular weight ranging from about 1,200 to about 750,000, and where n may vary from about 7 to about 5,000.

As the anionic polyelectrolyte, any suitable polyelectrolyte may be used. Specific examples of anionic polyelectrolytes include poly(styrenesulfonate) sodium salt:

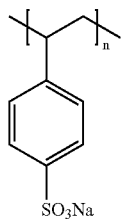

wherein n is from, for example, about 10 to about 5,000 such as from about 100 to about 1,000 (poly(styrenesulfonate) sodium salt) may have a weight average molecular weight of about 75,000 to about 250,000), polystyrene sulfonic acid, polystyrene sulfonic acid ammonium salt, polyacrylic acid:

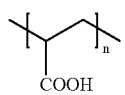

wherein n is from, for example, about 11 to about 75,000 such as from about 10 to about 60,000 (polyacrylic acid may have a weight average molecular weight of about 2,000 to about 5,000,000), and polyacrylic acid partial sodium salt.

An additional advantage that may be realized through the use of a multiple layer coating of alternating cationic and anionic polyelectrolytes is that the particles may be made to more readily disperse in the fluid of the electrophoretic display medium. For example, the presence of cationic and/or anionic species on the surface of the particles may either themselves promote dispersion of the particles in the display medium, or may be exchanged with additional ionic species that promote such dispersion. As one example, the anion, for example a Cl ion, associated with the surface of the particles as a result of the surface layer being a cationic polyelectrolyte, may be exchanged with a dispersion enhancing ionic species such as sodium dioctylsulfosuccinate:

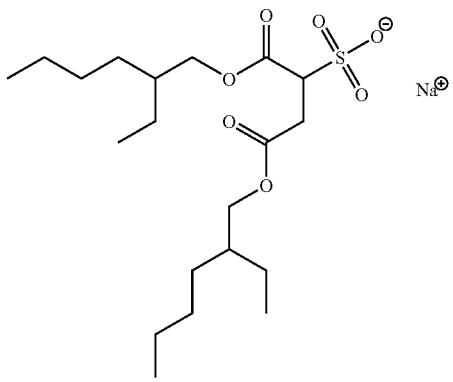

In this particular example, the resulting particles are hydrophobic.

Other dispersion enhancing species include nonionic surfactants such as SPAN 20 (sorbitan monolaurate), SPAN 60 (sorbitan monostearate), SPAN 80 (sorbitan monooleate), SPAN 85 (sorbitan trioleate), mixtures thereof and the like, as well as OLOA (polyisobutylenesuccinimide), or other anionic surfactants such as SDS (sodium dodecyl sulfate) or SDBS (sodium dodecylbenzene sulfonate).

The resulting particles having a dispersion enhancing ionic species thereon may readily disperse in the display medium, for example in a medium such as ISOPAR or DOW 200 5cSt silicone oil. This is because the dispersion enhancing species compatibilizes better with the oil as a result of being a bigger, bulkier material that is more compatible with the oil compared to a single species such as Cl$^-$.

As dyes for the colorant of the particles, examples of suitable dyes include Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba); Direct Brilliant Pink B (Global Colors), Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are preferred.

Examples of pigments that may be used as the particles herein, or that may be used as the colorant in polymer particles, include neat pigments such as, for example, titania, barium sulfate, kaolin, zinc oxide, carbon black and the like. The pigment should be insoluble in the suspending fluid. Additional pigments may include, for example, carbon black such as REGAL 330 carbon black, acetylene black, lamp black, aniline black, Violet PALIOGEN Violet 5100 (BASF), PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF), SUNFAST® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 12 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 160 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); mixtures thereof and the like.

In polymer particles, the colorant may be included in the particles in an amount of from, for example, about 0.1 to about 75% by weight of the particle, for example from about 1 to about 50% by weight or from about 3 to about 25% by weight of the particle.

In any of the foregoing particle embodiments, the particles may also include one or more external additives on the surfaces thereof. Such external additives may be applied by blending, for example with a Henschel blender. In embodiments, the external additive package may include one or more of silicon dioxide or silica ($SiO_2$), titanium dioxide or titania ($TiO_2$), titanic acid, cerium oxide, calcium or zinc stearate, and the like. The particles may have an average size (diameter) of from about 5 nm to about 250 nm. Mixtures of differently sized particles may also be used, for example a first silica having an average primary particle size, measured in diameter, in the range of, for example, from about 5 nm to about 50 nm, such as from about 5 nm to about 25 nm or from about 20 nm to about 40 nm and a second silica having an average primary particle size, measured in diameter, in the range of, for example, from about 100 nm to about 200 nm, such as from about 100 nm to about 150 nm or from about 125 nm to about 145 nm. The external additive particles may also be treated with a surface material.

In embodiments, the external additives may be used to impart charge to the particles. For example, a silica particle treated with polydimethylsiloxane (PDMS) or hexamethyldisilane (HMDS) can impart a positive charge. A titanic acid treated with isobutyl trimethoxysilane can impart a negative charge.

The density of the particles for the display medium may be substantially matched to that of the suspending fluid. For example, a suspending fluid may have a density that is "substantially matched" to the density of the particles dispersed therein if the difference in their respective densities is from about zero to about 2 g/ml, for example from about zero to about 0.5 g/ml.

Displaying of Images

In a display medium comprising the above-described low conductivity particle sets, the particles are first charged, for example through application of an electric field thereto, for an appropriate time and with an appropriate electric field. This field-induced or in situ charging imparts the appropriate charging characteristics to each of the sets of particles in the display medium. As will be further explained below, each of the sets of particles has a substantially zero charge at time t=0. Through application of the high electric field, each set of particles is charged to an appropriate level. Differently colored particle sets may be charged to different charge levels, thereby enabling the particles of each of the different sets to have different mobility rates within the fluid.

Figure 17:
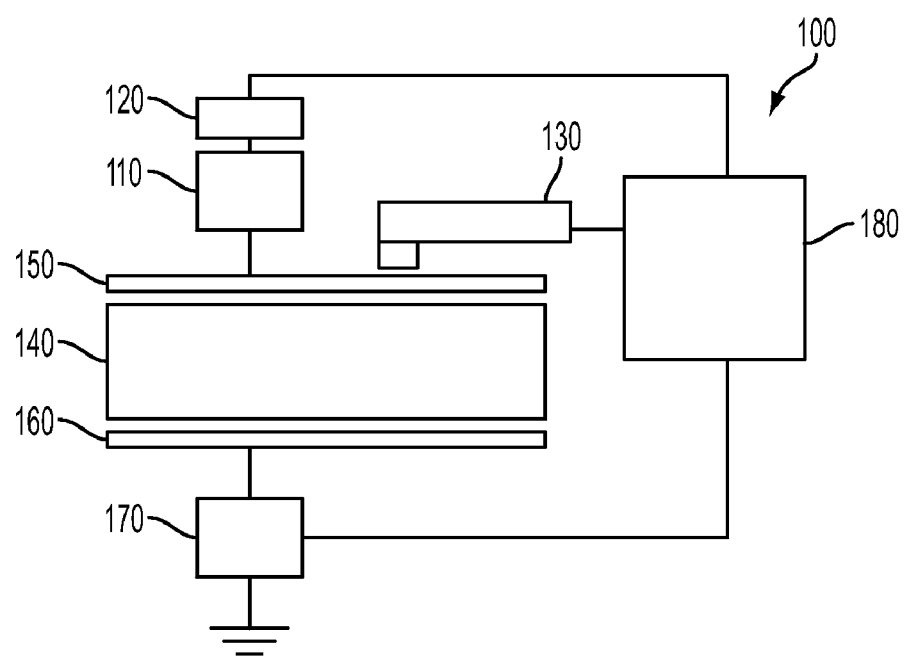
FIG. 17 illustrates a device for charging particles of a display device.

The field-induced or in-situ charging of the particles herein may be accomplished by any suitable method. One such method is illustrated in FIG. 17. The device 100 of FIG.

17 includes a cell 140 in which the display medium may be loaded, the cell being located between a pair of electrodes such as parallel-plate electrodes 150, 160. An appropriate electric field may be generated via control generator 120 and power supply 110, and the charging monitored by electrometer 170, which monitors the transient current. The reflection densitometer 130 monitors the change in reflectance of the display medium loaded in the cell 140 as it is switched back and forth by the electric field. The reflection densitometer may be controlled by, for example, LabVIEW interface software and a PC 180. In embodiments, the field strength applied may range from about 0.05 V/μm to bout 5 V/μm, for example from about 0.25 V/μm to about 3 V/μm or from about 0.5 V/μm to about 2 V/μm. The field may be applied for about 0.001 seconds to about 5 hours, for example from about 0.005 seconds to about 2 hours or from about 0.01 seconds to about 1 hour or from about 1 second to about 30 minutes. The field may take any form, and may specifically be a square waveform a triangular waveform, a sinusoidal waveform and the like.

The charging electric field may be applied to the display fluid after formation, that is, after addition of all of the differently colored particle sets thereto. Moreover, the field may be applied to the display fluid after the display fluid is located in a multiplicity of reservoirs of the display device to form a display layer of the device, or it may be applied to the display fluid prior to inclusion in the multiplicity of reservoirs of a display layer of the display device. If field induced charging is conducted on the display medium with multiple particle sets therein, the different particle sets should be chosen so as to each charge to a different charge level under application of a same charging field.

Application of different waveforms and field strengths, as well as properties of the display medium such as size of the particles therein, surfactants used in the manufacture of the particles, the composition of the polymers of the particles and/or inclusion on or in the particles of charge agents such as discussed above, and the like, affect the charging behavior of the particles in the display medium. The following examples illustrate the foregoing.

Figure 18:
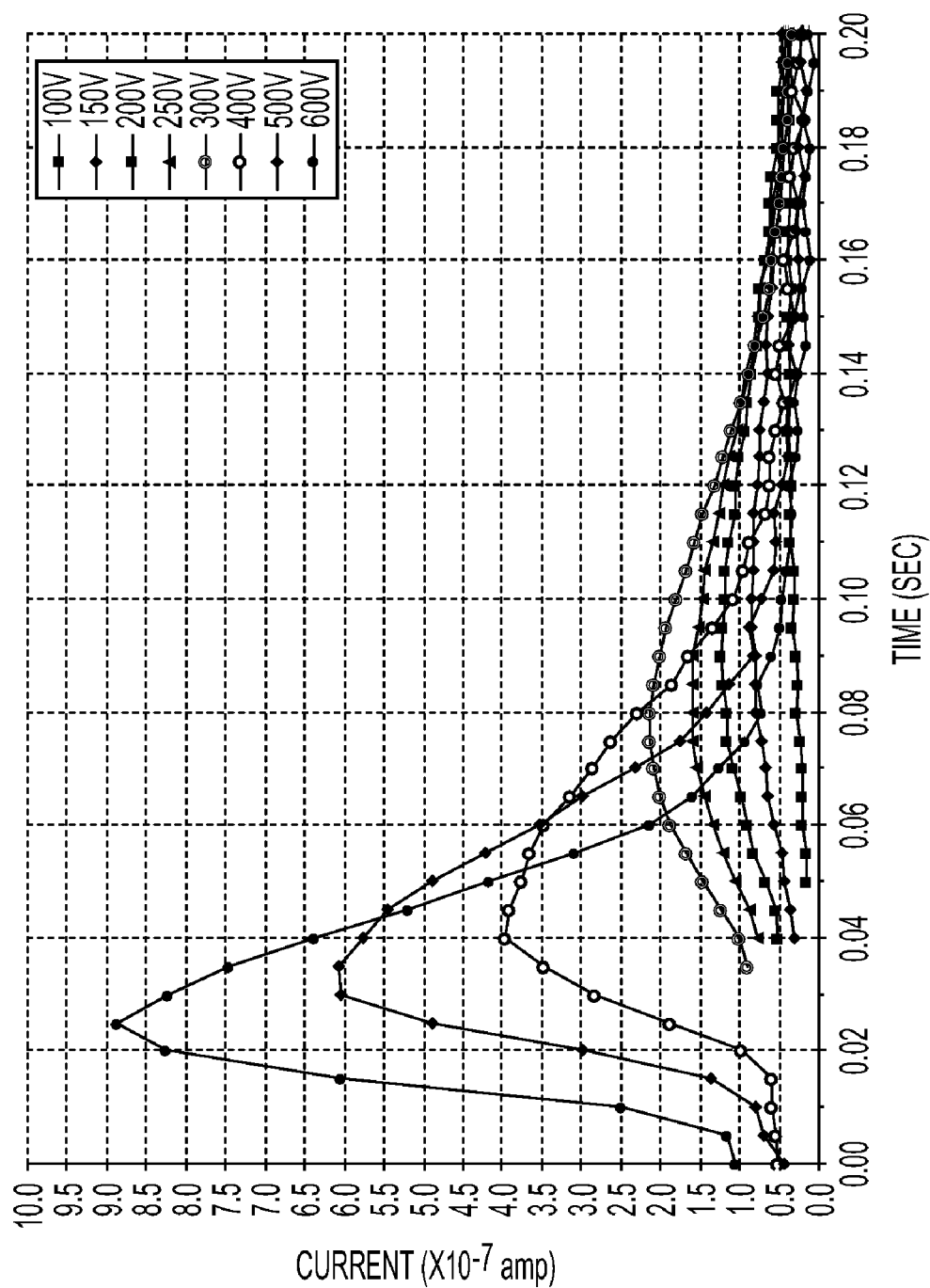
FIGS. 18 to 23 illustrate charging characteristics of particles for use in electrophoretic display devices.
Figure 19:
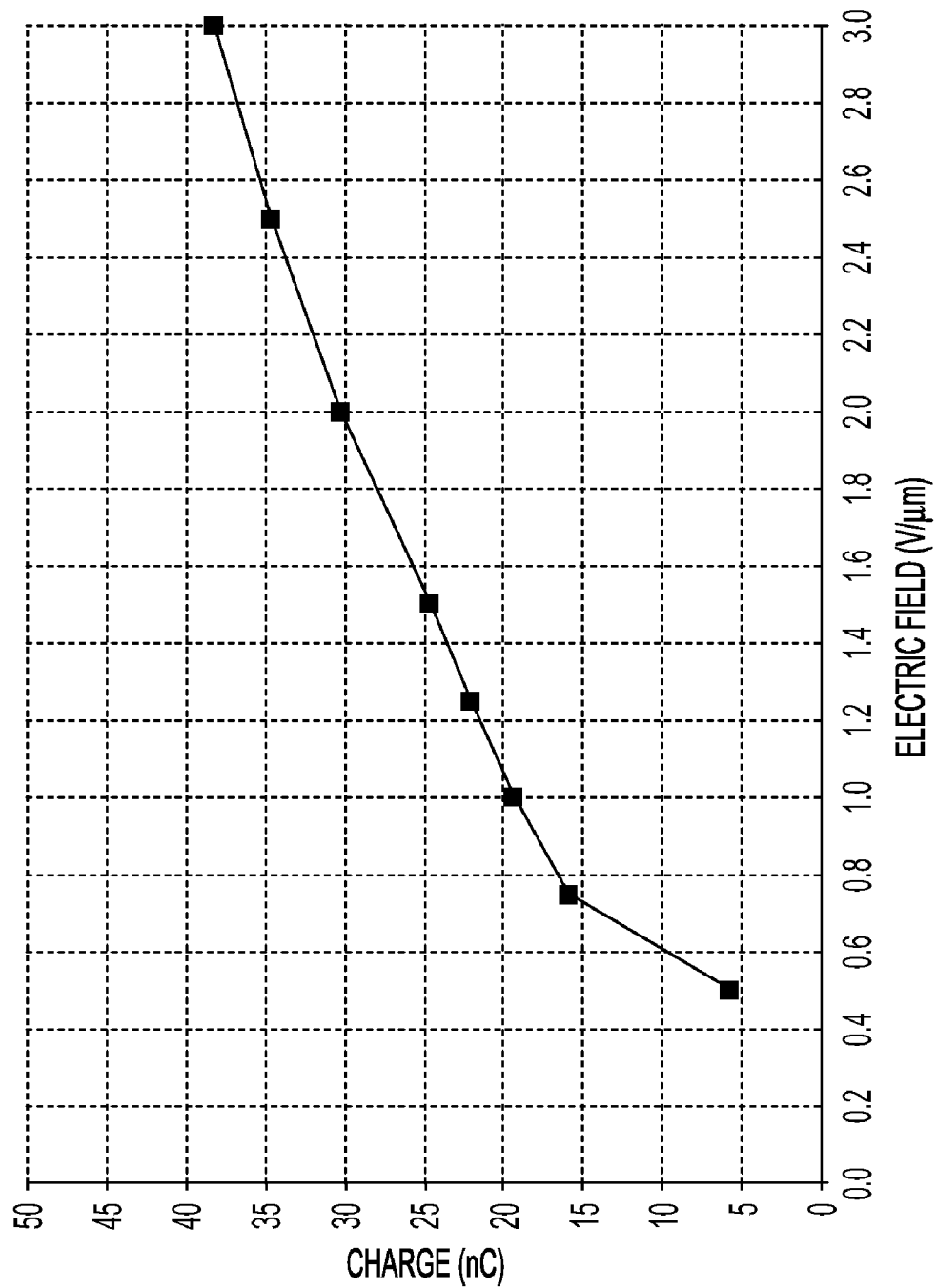

FIG. 18 shows the transient current characteristics for a display medium comprised of a yellow toner (Imari MF, a yellow emulsion aggregation styrene butylacrylate toner) dispersed in ISOPAR M (the solids loading of toner in ISOPAR M is 8% by weight) and using square-wave electric fields. FIG. 19 shows the total charge of the particles in the display medium acquired at different field strengths as determined from the integrated area under a current-time curve. Note that the charge values identified in the Figures refer to the total charge in the test cell in nC. To calculate the charge per unit mass (in μC/g), the total charge in the test cell is divided by the mass of toner in the test cell. The total mass is derived from the ink density. Herein, a standard value of 14 mg was used, which is typical for the mass of toner in an 8 wt. % ink in the cell. It can be seen from FIGS. 18 and 19 that the electrophoretic particles become charged by the electric field, and that charging increases with increasing electric field strength.

Figure 20:
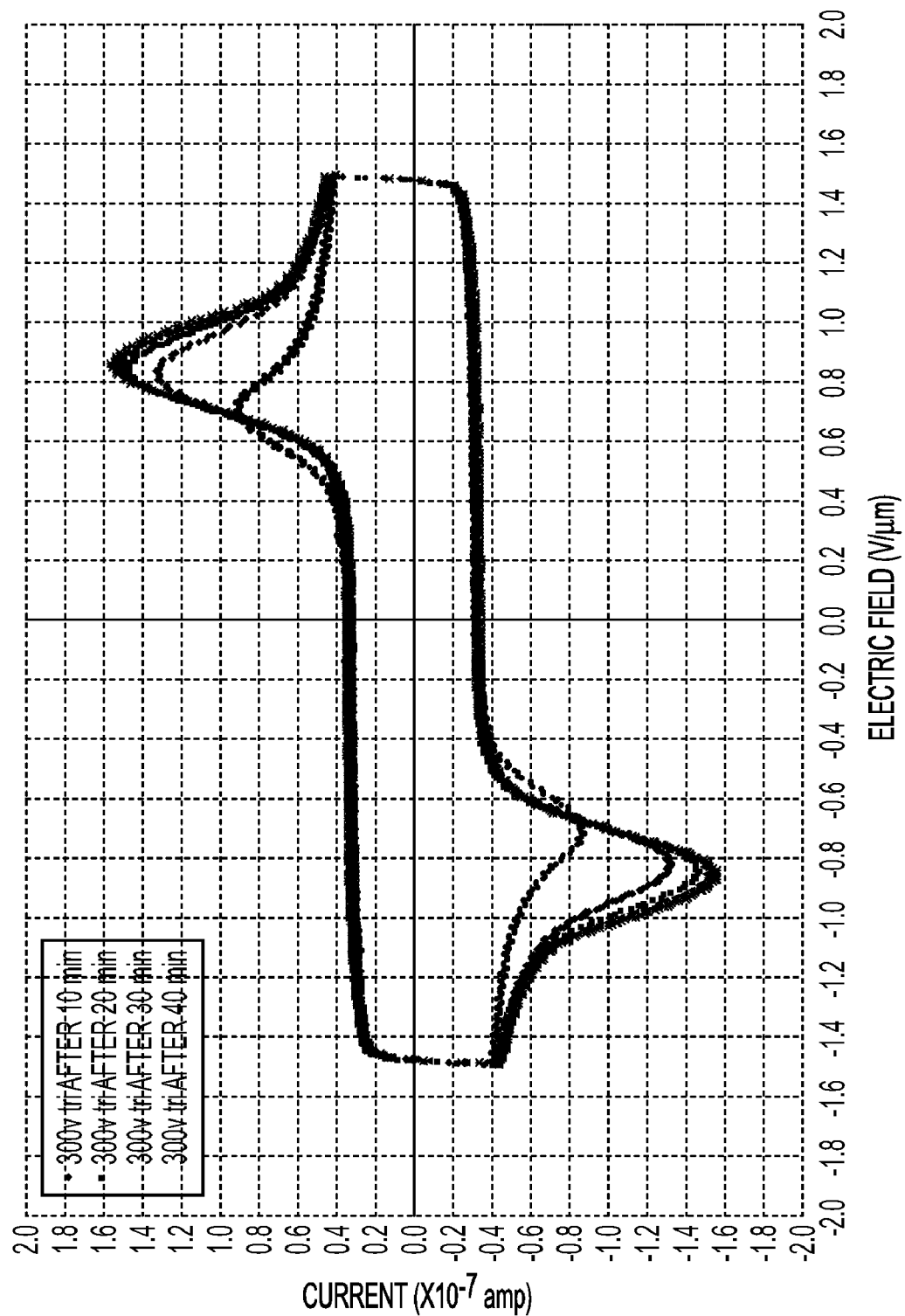
Figure 21:
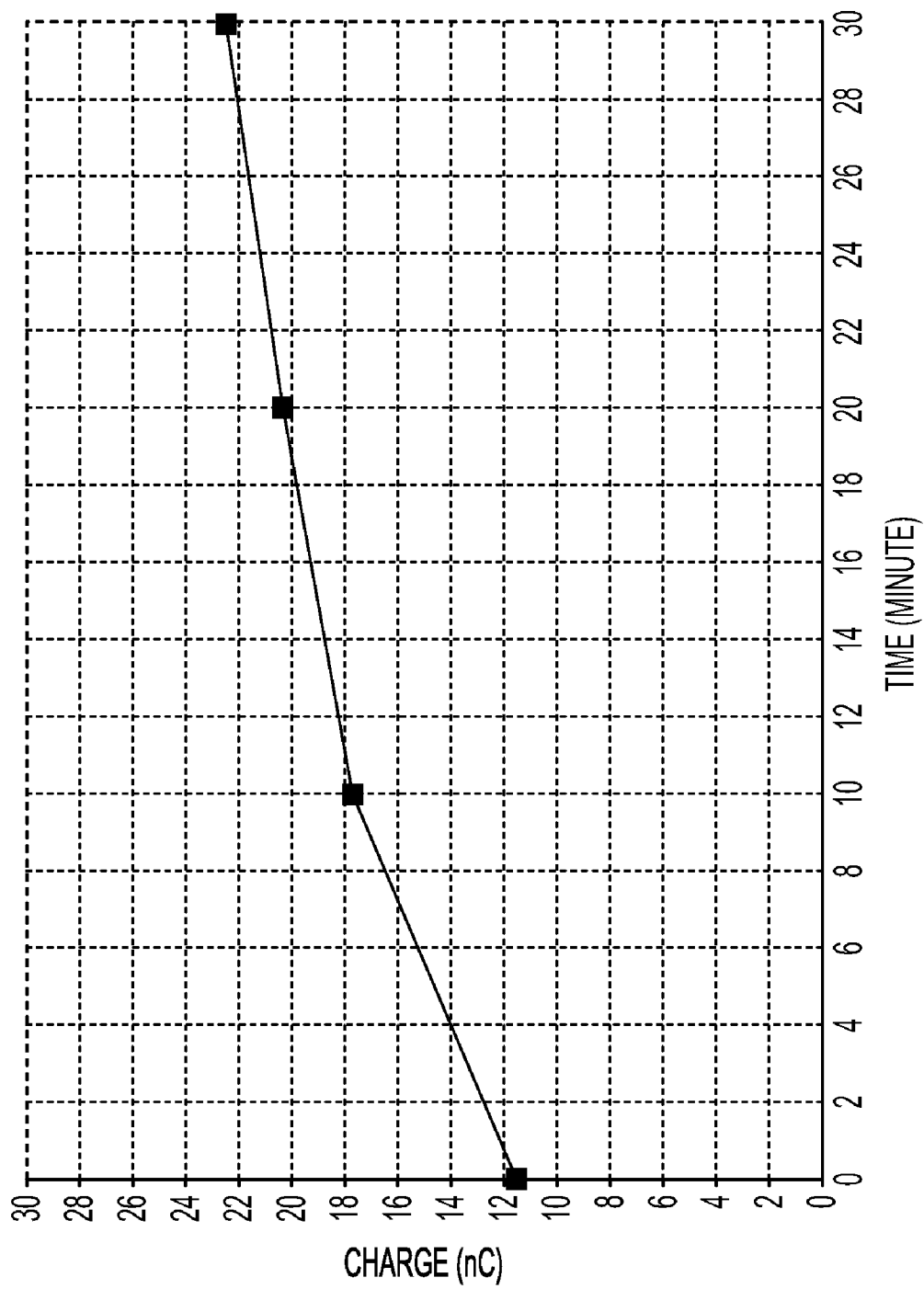

FIG. 20 shows the transient current characteristics for the same display medium used for FIGS. 18 and 19 using a triangular-wave electric field (300 millihertz) as a function of charging cycling time. The electric field is reported in units of V/μm, wherein μm is the gap between the electrodes. A peak is reflected where the particles jump from one side of the gap to the other, which temporarily peaks the current. An electric field peak around 1 V/μm indicates that for an electrode gap of 50 μm, a 50 V field is required to effect the jump. The total charge of the particles is shown in FIG. 21. The results again demonstrate that particles are charged by the electric field and that charging increases with cycling time. Also, the charging may be manipulated as a result of the type of wave applied for charging. The ink conductivity, given by the slope of the straight line portion of the current versus field curve, is about $1.9 \times 10^{-12}$ S/m, indicating that there are very few free ions in the display medium. The electric field strength, the cycling frequency (waveform), and the display medium materials are the parameters which appear to most significantly influence how fast the particles are charged. Similar results are obtained for differently colored particles, for example magenta, cyan and black Imari MF toners.

Figure 22:
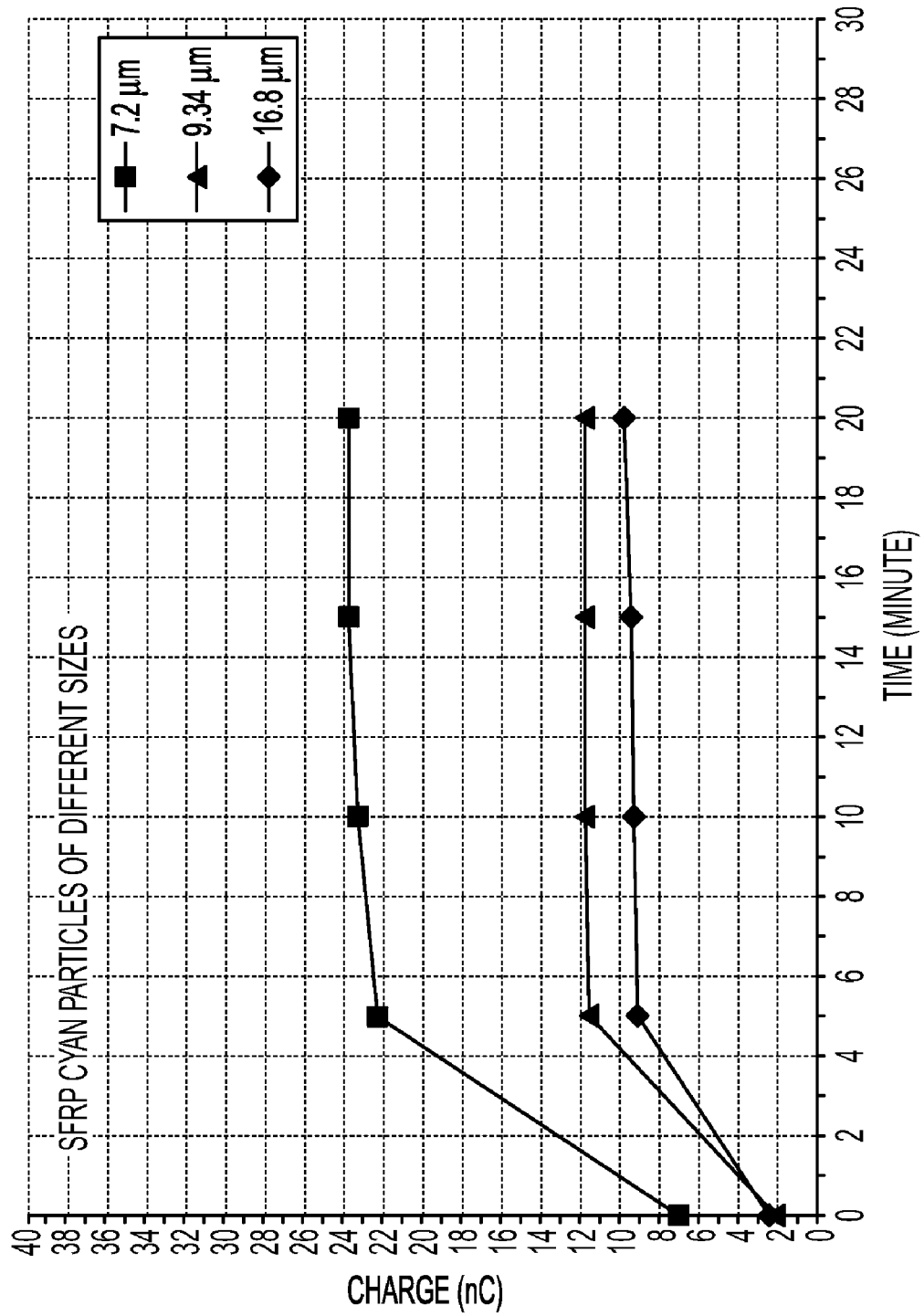

FIG. 22 shows an example of the charging characteristics for electrophoretic ink particles having three different sizes (7.2 μm, 9.3 μm and 16.8 μm). Each display medium is comprised of the indicated size of SFRP cyan styrene butylacrylate toner particles dispersed in ISOPAR M (the solids loading of toner in ISOPAR M is 8% by weight). As shown in FIG. 22, the smallest particles are able to acquire the highest charge, whereas the largest particles obtain the least charge, when charged for the same time and using the same charging waveform.

As also can be seen in FIGS. 19, 21 and 22, the particles may be made to possess a different charge, depending on how long the particles are subjected to the electric field. In other words, the particles may exhibit dynamic charging characteristics wherein the charge possessed by the particles may be ramped up where the field is applied longer and/or stronger. This enables differently colored but similarly composed and sized particle sets to be used together in a display device, since each of the similar but differently colored particle sets may still be made to have different charges so as to have different electrophoretic mobilities in the display device. In other words, the charge level of a given set of colored particles in embodiments is tunable via application of the charging field.

Figure 23:
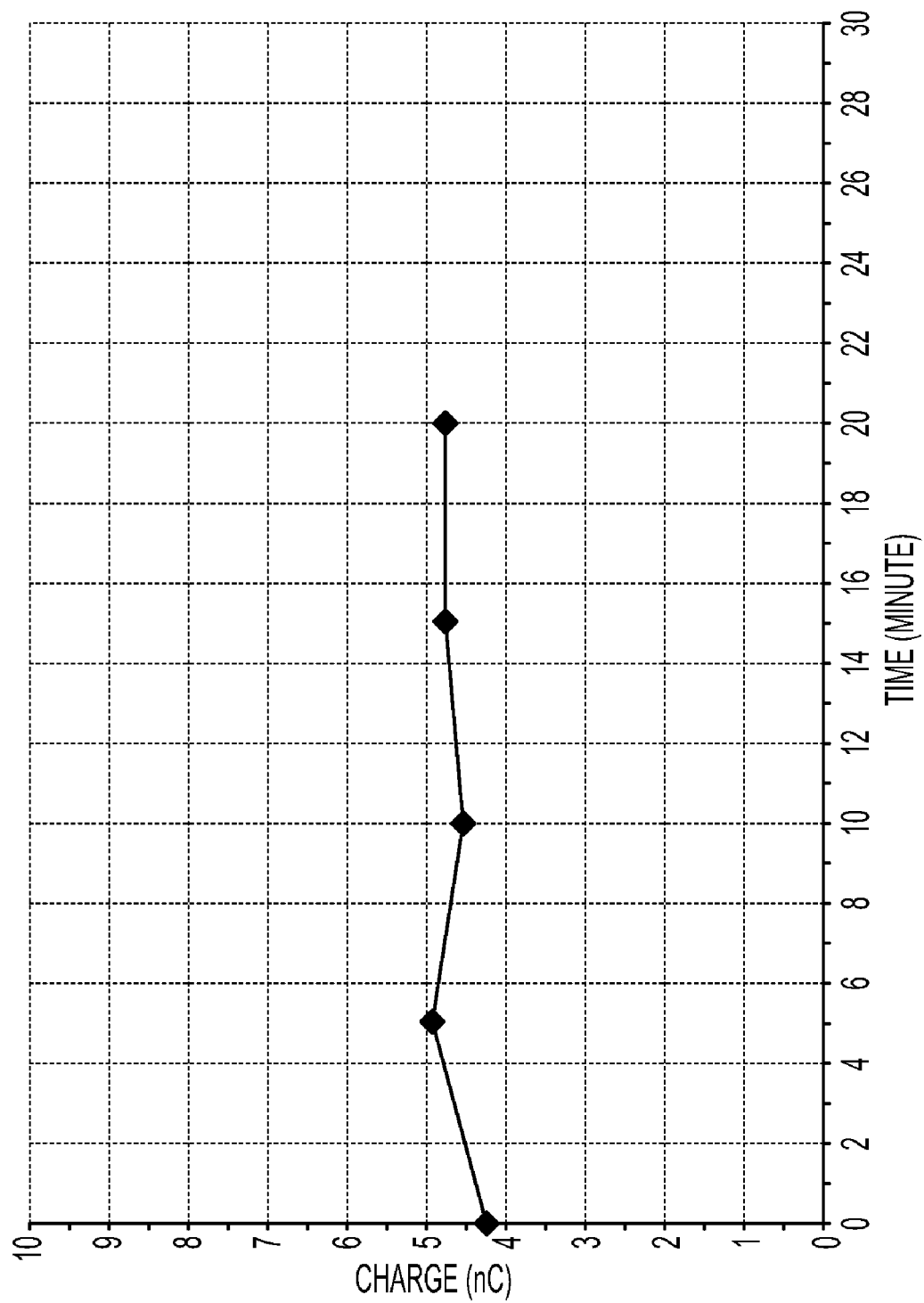

FIG. 23 shows a different charging behavior. Specifically, FIG. 23 shows the charging characteristics of an electrophoretic display medium composed of a conventional cyan polyester toner dispersed in ISOPAR M. The solids loading of toner in ISOPAR M is 8% by weight. This polyester toner is prepared via a conventional physical grinding process, not a chemical process such as emulsion aggregation. The conventional process for making polyester toner is a condensation polymerization of a diol (such as propylene glycol) and acid (such as terephthalic acid). The bulk polymer is then mechanically pulverized via extrusion in the presence of pigment to make fine toner particles. As can be seen in FIG. 23, the charging behavior is static, that is, the particles obtain substantially the same charge regardless of the length of time the field is applied. A factor for the static charging exhibited by the polyester toner is the absence of surfactants, coagulants, and other ionic species that are present in the emulsion aggregation toner preparation process.

As was discussed above, the different particle sets included in a display medium nay each be made to have a different electrophoretic mobility, for example through, having a different charge. For example, in a display medium containing four differently colored particle sets such as cyan, yellow, magenta and black, the cyan may be controlled to have a charge of about 3 μC/g, the yellow a charge of about 2 μC/g, the magenta a charge of about 1 μC/g and the black a charge of about 0.5 μC/g. The sets of differently colored particles thus should not have a substantially similar charge level, and thus for example each particle set should have a charge differing by at least about 0.1 µC/g from another differently colored set of particles, for example from about 0.3 µC/g or about 0.7 µC/g from each other, or more.

Under application of an appropriate AC or DC current to the display medium following the field induced charging, the charged particles in the display medium having different charge levels will move at different rates in response to the field, enabling the needed control over the movement of the particles to permit different colors to be displayed. Thus, through selection of appropriate differently colored particles, for example including the selection of particles composed of different materials, made by different methods, having different sizes, having different dynamic versus static charging characteristics, and the like, and/or through control over the charging of the differently colored particles, a multiple color and/or full color display can be obtained by including differently charged, differently colored particle sets in the display medium.

The field induced charging may be conducted on the display medium prior to use of the display device containing the display medium in forming images. Also, the field induced charging procedure may be repeated during the lifetime of the display device in order to renew or refresh the charges carried by the particles in the display medium. This permits the device to have a longer life, even where the particles in the display medium exhibit charge degradation over time. Here again, because the particles have low conductivity and do not depend on excess free ions in the display medium for charging, the particles are able to re-charge to substantially the same levels upon reapplication of the field induced charging field, thereby enabling the device to have a longer useful life. For this refreshing or recharging embodiment, it is again desirable to employ display mediums with multiple particle sets wherein the different particle sets each charge to a different charge level under application of a same electric field, so that no two sets of differently colored particles are made to acquire a substantially similar charge following the refreshing step.

In operating the electrophoretic display device so as to form an image therewith, an electric field, in particular a reversible direct current or an alternating current, is applied to the reservoirs of the device in order to move a desired color set of particles in the reservoirs so as to be displayed.

In embodiments of the display device, each of the individual reservoirs may be individually addressable, that is, a separate field may be applied to each individual reservoir of the device in order to generate an appropriate color at that individual reservoir or capsule. Appropriate sets or groups of different ones of the individual reservoirs may also be associated with a same driving electrode. For example, in a display, each reservoir or a set of reservoirs may represent a pixel or sub-pixel of an image, and each pixel or sub-pixel may thus be separately controlled to generate a desired overall image from the device. Control methods, including hardware/software, for controlling each reservoir of the display device in a manner enabling an overall image to be shown are known in the display arts, and any such control method may be applied herein. To permit individual addressability, the size of the electrodes may be the same as or smaller than the size of the individual reservoirs of the display device, enabling individual control of each. In this manner, the electric field applied to each reservoir/capsule can be individually controlled. Also, the size of the electrodes can be different from (for example, larger than) the size of the reservoirs, thereby enabling more than one reservoir to be controlled by a single electrode where the electrode is larger than the reservoir/capsule, or also enabling only a portion of the reservoir to be controlled (turned on and off) by an electrode where the electrode is smaller than the size of a reservoir. That is, the pattern of the electrodes does not need to line up with the reservoirs. Any of the foregoing can be done by for example, appropriate patterning of the conductive path on the bottom conductive substrate. An example of the patterning of electrodes can be found in, for example, U.S. Pat. No. 3,668,106, incorporated herein by reference in its entirety.

Control of the color displayed by an individual reservoir of a display device may be demonstrated through the following explanation. In this example, the display medium contains at least four differently colored particle sets of cyan, yellow, magenta and black, the cyan having a charge of about 3 µC/g the yellow a charge of about 2 µC/g the magenta a charge of about 1 µC/g and the black a charge of about 0.5 µC/g. As a result of each differently colored particle set having a different charge, specifically a different low conductivity charge, each differently colored particle set will respond differently to an applied electric field (that is, each differently colored particle set exhibits a different electrophoretic mobility). In this example, the cyan particles carry the highest charge level, and thus respond most rapidly under an applied electric field. Thus, to display the cyan particles to a viewer, the particles may first be pulled (attracted) to the rear substrate by application of an electric field. Upon reversal of the electric field, the cyan particles will be most rapidly attracted to the front facing electrode, such that the viewer will perceive only cyan at that reservoir/capsule.

The set of yellow particles has the second highest charge level. To display the yellow particles, the electric field from the cyan color display above is again reversed to pull the particle sets back toward the rear electrode. However, the field is applied for only so long as necessary for the cyan particles to move past the yellow particles toward the rear electrode. Once the cyan particles have moved past the yellow particles, the yellow color is perceived by a viewer since at this point the yellow particles are closest to the front electrode. If the reversal of the field is applied for a longer time, then the yellow particles will move past the magenta particles toward the rear electrode. Halting application of the field at this transition point will enable magenta to be perceived by the viewer since at this point the magenta particles will be closest to the front electrode. Finally, as the black particles in this example move slowest because they possess the lowest charge, maintaining the reversal of the field until the magenta particles move past the black particles, for example maintaining the reversal of the field until the particle sets in the display medium are pulled to the back electrode, enables the black particles to be perceived by the viewer since at this point the black particles will be closest to the front electrode.

The strength of the electric field that may be applied to effect movement of the particles may be defined as the voltage divided by the thickness of the gap between the two electrodes. Typical units for electric field are volts per micron (V/µm). FIG. 19 shows the charge level of the particle vs. the applied electric field. The electric field ranges from 0.5 to 3 V/µm. Applied electric fields may range from about 0.1 V/µm to about 25 V/µm, for example from about 0.25 V/µm to about 5 V/µm, or from about 1 V/µm to about 2 V/µm, or any ranges in between. The duration of electric field application can range from about 10 msec to about 5 seconds, or from about 100 msec to about 1 second, or any ranges in between. Generally, the greater the charge on the particles, the faster the particles will move for a given electric field strength. For example, by looking at FIG. 18, the transit time is the highest peak of the curve. This transit time represents the average time for all the particles to jump from one electrode to the other. Clearly, for the 600 V curve, the transit time peak occurs at just past 0.02 sec (20 msec). Using FIG. 8 as an example, if one imagined that the various voltage curves represented various particle groups' mobilities, at 20 msec one set of particles (the 600 V trace) would have crossed the gap, but the other sets of particles (represented by the other traces) would be only ½ or ⅓, or maybe only ¼ of the way across the gap. This information thus can be used to determine the field strengths and application durations necessary to display each of the colors of a multiple color display medium.

Of course, any colored particle set in the display medium may be made to move more rapidly than a differently colored particle set without restriction, and the ordering of mobilities in this example is arbitrary for illustration purposes.

Figure 27:
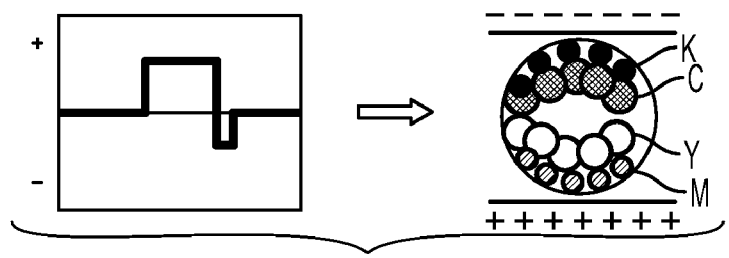

As another specific example of controlling color display is a multi-color display medium, reference is made to FIGS. 34 to 27. Here, yellow particles (Y) are made to have a high positive charge and magenta particles (M) to have a low positive charge, with cyan (C) having a high negative charge and black (K) a low negative charge. The particles with the higher charge are shown larger in the Figures, but this larger size is to depict the larger charge and not necessarily the actual size relationship among the particles. The particles may all have the same size, or the larger charge particles may actually be smaller in size than the lower charge particles.

Figure 24:
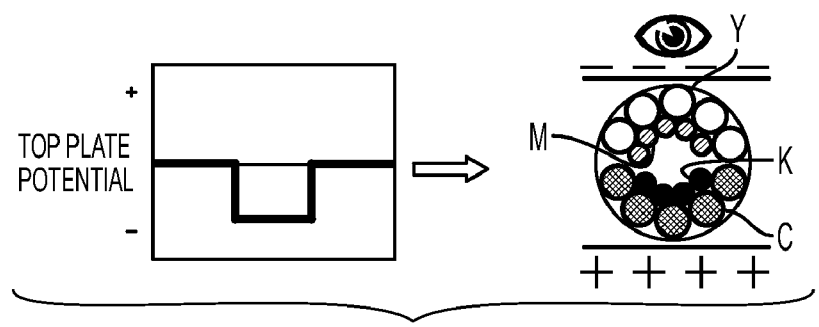
FIGS. 24 to 27 illustrate methods of controlling the color displayed by a cell of a display device.
Figure 25:
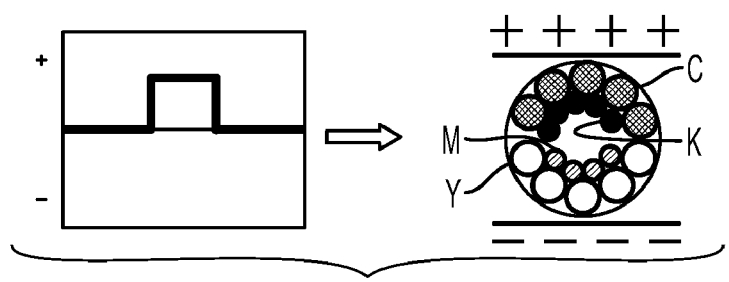

To enable the selective migration of the desired set of colored particles, the driving voltage waveform is changed from positive to negative polarity or vice versa. When the top plate is charged + (FIG. 25), the − charged pigments are attracted to this electrode. The higher charge particles, in this case cyan, will be the first particles to move to this electrode, followed by the lower mobility black particles, and thus cyan is displayed. When the top plate potential is switched from + to − (FIG. 24), the fast moving + particles, in this case yellow, are attracted first, followed by the slower moving magenta species. The viewing of the highly charged particles is thus relatively straightforward, as they will be always be the first particles to reach the oppositely charged electrode.

Figure 26:
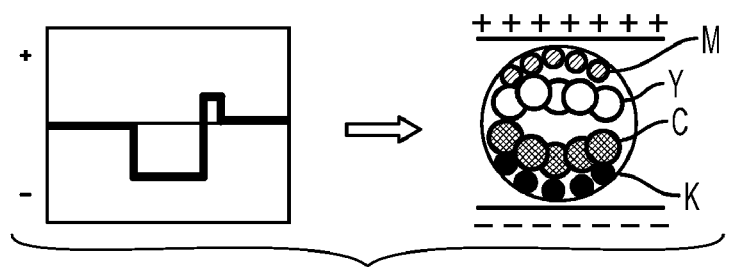

In order to selectively view the lower mobility species, the voltage waveform is modified by the addition of a brief switching voltage pulse as shown in FIGS. 26 and 27. This selective pulse reverses the polarity of the current/electric field across the conductive substrates and thus reverses movement of the highly charged particles for a brief instant, and causes these particles to move toward the middle of the cell. The electric field is then removed once the higher mobility particles have moved past the lower mobility particles toward the rear substrate, and before the additional particle sets of opposite polarity are moved closer to the front viewing conductive substrate than the lower mobility particles. What remains on the outside (that is, a viewable side) are the slow moving low mobility particles, as they are much less sensitive to this pulsed electric field. Thus, by pulsing the electric field to attract negative charge particles to the rear substrate, the lower charge black negative particles are displayed in place of the higher negative charge cyan particles (FIG. 27). Similarly, when the higher positive charge yellow particles are displayed, by pulsing the electric field to attract the positive charge particles to the rear substrate, the lower positive charge magenta particles are displayed in place of yellow (FIG. 26).

Embodiments, the higher mobility particles may have a charge of from about ±1 to about ±5 μC/g for example from about ±2 to about ±3 μC/g and the lower mobility particles a charge of from about ±0.1 to about ±1 μC/g for example from about ±0.1 to about ±0.7 μC/g.

The above controls over the display of colors in a multi-color system may be applied to a display medium containing any number of differently colored particle sets, for example including two, three, four or even more particle sets. Highlight color particle sets, for example blue highlight color, red highlight color, green highlight color and the like highlight color particle sets may be included in multi-color particle sets to add additional color range capabilities to the display, and the control of the colors may be effected as described above. The total particle sets, including highlight color particle sets, in the display medium thus may be five, six, seven, eight or even more.

Upon removal of the electric field, the particles may be maintained in the selected color state through any suitable means. For example, the sets of particles may be made to have a slightly different density from the display fluid such that upon removal of the field, the particles float to the top or bottom of the display. Because no field is applied, the particles should substantially maintain the color order at the time the field was removed during such settling movement. Alternatively, the fluid may have a sufficiently thick viscosity to maintain the particle color order upon removal of the electric field. For example, a viscosity range of 0.65 to 20 cSt, such as from about 1 to about 20 cSt or from about 5 to about 20 cSt, may be appropriate. To facilitate a sufficiently viscous fluid, the fluid may contain a gellant, for example as described in U.S. Patent Publication No. 2007-0002428, incorporated herein by reference in its entirety. The gellant acts to thicken the fluid viscosity at lower temperatures or when an electric field is not applied, enabling images to be fixed within the reservoir/capsule. Other methods for fixing the displayed image could come in the form of other means of altering the fluid viscosity. Phenomena such as electrorheological effects (where the fluid viscosity changes upon the application of an electric field), magnetic field effects (where the fluid viscosity changes in response to a magnetic field), and the like could be utilized, if desired.

Embodiments will now be further illustrated by way of the following examples.

EXAMPLE 1

In this example, use of emulsion aggregation particles in a two particle electrophoretic display is demonstrated.

Preparation of negatively charged emulsion aggregation cyan particles. Cyan toner particles are prepared via aggregating dispersions of a styrene/butylacrylate/carboxylic acid terpolymer non-crosslinked resin particles, a second cross linked copolymeric resin of styrene/butylacrylate/carboxylic acid with divinyl benzene, and a cyan pigment in the presence of two cationic coagulants to provide aggregates which are then coalesced at temperatures above the non-crosslinked resin Tg to provide spherical particles. These particles are then washed (4×) with deionized water, dried, and dry-blended with an additive package comprising at least a silica surface treated with polydimethylsiloxane (PDMS) and having a primary particle size of about 40 nm.

Another additive that may be used is a titanic acid with alkyl group functionality having a primary particle size of about 40 nm.

Preparation of positively charged emulsion aggregation magenta polyester particles. A surface treated polyester-type emulsion aggregation toner is used for the magenta particles. The surface treatment additive is the cationic methacrylate copolymer EUDRAGIT EPO. The cationic polymer is added in its dissolved form to the acidified toner slurry. The pH is slowly increased to 10 to 12 so that the cationic polymer precipitates on the surface of the toner.

Preparation of display medium. The two colors of particles were mixed with DOW 200 5cSt (5 centistokes) fluid, a polydimethylsiloxane polymer available from Dow Corning, in a 1:1 mass ratio for a solids loading of about 25%. Zirconia beads were added as mixing aids to evenly disperse the mixture of particles in the fluid. No additional external charge control agents were added. The ink was sandwiched between 2 parallel plates separated by a 145 µm spacer gasket. A square wave voltage of +/−200V was applied to the two plates, and the color transition was observed as the two toners migrated back and forth between the two plates.

The charge of the particles enables rapid particle translation in an electric field, and very fast response to changes in the electric field. The device may be switched at rates of about 15 to about 20 Hz or more. As a result, the electrophoretic display may be used for video display, as the device exhibits switching rates suitable for video rates, which require a frame rate of up to 30 fps (standard video rate).

EXAMPLE 2

In this example, use of a silicone fluid as a fluid in a display medium with emulsion aggregation particles is demonstrated.

Two colors of emulsion aggregation toner particles were mixed with DOW 200 5cSt fluid, in a 1:1 mass ratio for a solids loading of about 25%. Zirconia beads were added as mixing aids to evenly disperse the mixture of toner particles in the fluid. No additional external charge control agents were added.

The display medium was sandwiched between two parallel plates separated by a 145 µm spacer gasket. A square wave voltage of +/−200V was applied to the two plates, and color transition was observed as the two toners migrated back and forth between the two plates.

EXAMPLE 3

Incorporation of maleic anhydride into an emulsion aggregation particle at the latex step. To a bulk polymerized styrene/butylacrylate (200 ml, ~20% conversion, Mn=1, 900) was added maleic anhydride (16 g). The mixture was heated to ~50° C. until all the maleic anhydride dissolved. This was added to an aqueous solution (600 g water and sodium dodecylbenzenesulfonate (SDBS), 16 g) and stirred for 5 minutes. The resulting mixture was piston homogenized 3 times at 500 BAR and then transferred to a 1 L BUCHI reactor. Pressurizing with argon and then depressurizing (5 times) deoxygenated the latex mini-emulsion. This was then heated to 135° C. After 1 hour at temperature, a solution of ascorbic acid (8.5 ml of a 0.1 g/ml concentration) was added via pump at the rate of 0.035 ml/minute. The reaction was cooled after 6 hours to afford a resin in the latex of ~200 microns with a solids content of 24.9% and Mn=9, 700 and Mw=23,000.

Aggregation of latex using diamines. To a stable free radical polymerization latex (707 g, 23.48% solids content) was added 660 ml of water and pigment (cyan blue, BTD-FX-20, 47.8 g). This was stirred at room temperature and a diamine (JEFFAMINE, D-400, 6.89 g in 100 ml water) was added over a 10 minute period. The resulting thickened suspension was heated to 55° C. over a 1 hour period. The suspension was then basified using NaOH (concentrated) to a pH of 7.3. This was subsequently heated to 95° C. over a 2 hour period and maintained at temperature for 5 hours. The suspension was then cooled, filtered, and washed 5 times with water until the filtrate conductivity was less than 15 microSiemens/cm$^2$. The resulting powder was resuspended in minimal water and freeze dried to give 130 g of a 13.4 µm particle.

EXAMPLE 4

Incorporation of maleic anhydride into an emulsion aggregation particle at the bulk polymerization step. A stock solution of styrene (390 mL) and butylacrylate (110 ml) was prepared and to 400 ml was added TEMPO (3.12 g, 0.02 mole) and vazo 64 initiator (2.0 g, 0.0125 mole). This was heated under a nitrogen atmosphere to 135° C. (bath temperature) and then added to it dropwise a solution of maleic anhydride (9.8 g) in 100 ml of the styrene/butylacrylate stock solution that had been deoxygenated using nitrogen. The addition was done over a 30 minute period after which it was stirred for 5 more minutes and then cooled to afford a poly(styrene/maleic anhydride-b-styrene/butylacrylate) (Mn=4,990 with PD=1.23) solution in styrene/butylacrylate monomer.

Preparation of poly(SMA-b-S/BA) Latex. A polymer solution of the above (300 ml), styrene (117 ml), butylacrylate (33 ml) and TEMPO (0.6 g) was added to a solution of SDBS (36 g, 1.2 l water) and stirred for 5 minutes. Then the mixture was piston homogenized once at a pressure of about 500 BAR and then discharged into a 2L BUCHI reactor. This was heated to 135° C. (reactor temperature) and when the reactor reached temperature a solution of ascorbic acid (2.4 g in 12 ml water) was added dropwise at a rate of 0.0283 ml/minute for a total of 8.5 ml. After 6 hours at reaction temperature the reactor was cooled and 1,401.3 g of latex was discharged affording a poly(styrene/maleic anhydride-b-styrene/butylacrylate) (Mn=39,168 with a polydispersity (PD)=1.64).

Aggregation/coalescence of latex using diamine as aggregant. To the above latex (50 ml) was added 50 ml of water and stirred at room temperature while adjusting the pH to ~1.78. To this was added dropwise 2.89 g of a JEFFAMINE D400 solution (20% w/w in water) at 23-25° C. and then slowly heated up to 60° C. over ~1 hour. The particle size grew from about 200 nm to 6.8 µm. The solution pH was adjusted to pH 9.04 with dilute NaOH and then further heated slowly to 95° C. over the course of ~1.5 hour and maintained at temperature for 1.5 hours to afford a coalesced white particle of 6.68 µm size (Mn=39,168).

EXAMPLE 5

Preparation of Positively Charged Emulsion Aggregation Polyester Toner Particles.

Comparative Example (Control): A pilot plant batch of toner comprised of a linear sulfonated polyester resin (12% solids) (the composition of the polyester resin consists of approximately an equimolar amount of glycol monomers and aromatic di ester molecules), 9% carnauba wax dispersion and 6% by weight of FLEXIVERSE BLUE (Pigment Blue 15:3, BFD1121, 47.1% solids) dispersion (Sun Chemical Co.) was prepared. Aggregation of cyan polyester toner particles was done at 58° C. in a 30-gallon stainless steel reactor (of which only 20 kg of the toner yield was used for bench scale studies). The agitation rate was set initially to 100 RPM. A 5% zinc acetate solution was added as the coagulant, where 60-80% of the total zinc acetate solution was added quickly (600 g/min for the first 30 minutes) and the remainder (80-100 g/min thereafter) is added at a reduced rate. The amount of zinc acetate equaled approximately 11% of the total resin in the emulsion. After 7 hours of aggregation, the particle size reached 5.24 µm with a geometric standard deviation (GSD) of 1.2. Full cooling was applied and particles were sieved at 30-35° C. through a 25 µm nylon filter bag. A portion of the toner slurry was washed in the lab three times with deionized water after mother liquor removal, resuspended to approximately 25% by weight solids and freeze-dried for 48 hours to give the untreated parent toner.

Example: EUDRAGIT EPO solution (1%) was prepared by dissolving 1.26 g in 124.7 g of 0.3 M $HNO_3$; the pH of the solution was lowered to about 2 by adding 1.0 M $HNO_3$. Lowering the pH to 2 ensured complete solubility of the polymer in solution. The total percentage of EPO to toner was to equal 3% by weight of dry toner.

The above pilot plant toner was treated in the lab via a pH shifting procedure where EPO is soluble or insoluble in aqueous solution depending on the pH of the aqueous solution. A 327 g quantity of the aqueous toner suspension (12.89% by weight solids), which was separated from its mother liquor, was stirred in a 1 L glass Erlenmeyer flask on a stir plate at 250-300 rpm. The pH of the toner slurry was lowered from 5.5 to 2.4 with 0.3 M $HNO_3$. The EPO solution was added drop wise to the toner slurry and stirred for 1 hour at room temperature. After 1 hour, the pH of the toner slurry was increased to 12.2 with 1.0 M NaOH and left to stir overnight at 300 under ambient temperature. The surface treated toner was then filtered and washed four times. The filtercake was then resuspended to approximately 25% by weight solids and freeze-dried. The pH of the filtrates was always greater than 9.5 and showed no sign of precipitated EPO; it can be assumed that all EPO polymer was transferred to the toner surface. The charge on these particles was measured to be about 0.8 µC/g.

EXAMPLE 6

Preparation of Multilayer Coating on Emulsion Aggregation Particles.

Cationic layer: 20 g of yellow emulsion aggregation polyester toner in which the base resin is a linear polyester containing about 3.75 mol % sulphonation, the aggregating agent is $Zn(OAc)_2$, and the pigment if YFD from Sun Chemicals, was dispersed in 920 ml deionized water by mechanical stirring. 40 wt %. NaCl solution (ca 75 ml) was added to the solution, followed by 2 wt % poly(diallyldimethylammonium) chloride (PDAD) (25 ml) (Mw of 100-200 k). The overall solution contains 2 wt % toner in 0.25M NaCl with 0.1 wt % PDAD. The solution was mechanically stirred for 1 hour, filtered, and the wet toner cake was then washed with water (900 ml) for 3 times. The particles exhibit a positive zeta potential, or example of about 15 mV, in water, ISOPAR and silicone oil.

Anionic layer: The positively charged particles are redispersed in 920 ml deionized water by mechanical stirring. 40 wt % NaCl solution (ca 75 ml) was added to the solution, followed by 2 wt % poly(styrenesulfonate, sodium salt (PSS) (25 ml) (Mw of <100 k). The overall solution contains 2 wt % toner in 0.25M NaCl with 0.1 wt % PSS. The solution was mechanically stirred for 1 hour, filtered, and the wet toner cake was then washed with water (900 ml) for 3 times. The particles exhibit a negative zeta potential, for example of about −25 mV, in water, ISOPAR and silicone oil.

Multilayer formation: The positive PDAD and negative PSS layers were then deposited in alternating manner until a desired number of layers was formed, in this case 10 total layers. Each alternating layer exhibited the aforementioned positive or negative zeta potential.

EXAMPLE 7

Preparation of Multilayer Coating on Emulsion Aggregation Particles.

Cationic layer: 10 g of cyan emulsion aggregation poly (styrene acrylate) toner with 10% crosslinked gel content was dispersed in 400 ml deionized water by mechanical stirring. 40 wt % NaCl solution and 2 wt % PDAD (25 ml) (Mw of 100-200 k) was added to the solution. The overall solution comprised 0.25M NaCl and 0.1 wt % PDAD. The solution was mechanically stirred for 1 hour, filtered, and the wet toner cake was then washed with water (900 ml) for 3 times. The particles exhibit a positive zeta potential in water, ISOPAR and silicone oil.

Anionic layer: The positively charged particles are redispersed in 400 ml deionized water by mechanical stirring. 40 wt % NaCl solution was added to the solution, followed by 2 wt % (PSS) (25 ml) (Mw of <100 k). The overall solution comprised 0.25M NaCl and 0.1 wt % PSS. The solution was mechanically stirred for 1 hour, filtered, and the wet toner cake was then washed with water (900 ml) for 3 times. The particles exhibit a negative zeta potential in water, ISOPAR and silicone oil.

Multilayer formation: The positive PDAD and negative PSS layers were then deposited in alternating manner until a desired number of layers was formed, in this case 4 total layers.

EXAMPLE 8

Preparation of Highlight Color Emulsion Aggregation Toner Particles.

Preparation of crosslinked latex B. A crosslinked latex emulsion comprised of polymer particles generated from the emulsion polymerization of styrene, butyl acrylate and beta carboxy ethyl acrylate (β-CEA) was prepared as follows. A surfactant solution of 4.08 kilograms of NEOGEN™ RK (anionic emulsifier) and 78.73 kilograms of deionized water was prepared by mixing these components for 10 minutes in a stainless steel holding tank. The holding tank was then purged with nitrogen for 5 minutes before transferring the resulting mixture into the above reactor. The reactor was then continuously purged with nitrogen while the contents were being stirred at 100 RPM. The reactor was then heated up to 76° C. and held there for a period of 1 hour.

Separately, 1.24 kilograms of ammonium persulfate initiator was dissolved in 13.12 kilograms of deionized water. Also separately, monomer emulsion was prepared in the following manner. 47.39 Kilograms of styrene, 25.52 kilograms of butyl acrylate, 2.19 kilograms of β-CEA, 2.92 kilogram of divinyl benzene (DVB) crosslinking agent, 1.75 kilograms of NEOGEN™ RK (anionic surfactant), and 145.8 kilograms of deionized water were mixed to form an emulsion. One (1) percent of the emulsion was then slowly fed into the reactor, while the reactor was being purged with nitrogen, containing the aqueous surfactant phase at 76° C. to form seeds. The initiator solution was then slowly charged into the reactor and after 40 minutes the remainder of the emulsion was continuously fed in using metering pumps over a period of 3 hours.

Once all the monomer emulsion was charged into the above main reactor, the temperature was held at 76° C. for an additional 4 hours to complete the reaction. Cooling was then accomplished and the reactor temperature was reduced to 35° C. The product was collected into a holding tank. After drying, the resin latex onset Tg was 53.5° C. The resulting latex was comprised of 25 percent crosslinked resin, 72.5 percent water and 2.5 percent anionic surfactant. The resin had a ratio of 65:35:3 pph:4 pph of styrene:butyl acrylate:β-CEA:DVB. The mean particle size of the gel latex was 50 nanometers as measured on disc centrifuge, and the resin in the latex possessed a crosslinking value of about 50 percent as measured by gravimetric method.

Toner preparation. Preparation of a Blue toner (PB. 15.0)—highlight blue. 310.0 Grams of the above prepared latex emulsion (Latex A) and 100 grams of an aqueous Blue pigment dispersion containing 36.8 grams of Blue pigment (PB 15.0) available from Sun Chemical Corporation, having a solids loading of 54.0 percent, were simultaneously added to 500 milliliters of water with high shear stirring by means of a polytron. To this mixture was added a 23.5 grams (grams) of polyaluminum chloride (PAC) solution containing 3.5 grams of 10 percent solids and 20 grams of 0.2 molar nitric acid, over a period of 2 minute, followed by the addition of 23.5 grams of cationic surfactant solution containing 3.5 grams of the coagulant SANIZOL B™ (60 percent active ingredients) and 20 grams of deionized water and blended at speed of 5,000 rpm for a period of 2 minutes. The resulting mixture was transferred to a 2 liter reaction vessel and heated at a temperature of 50° C. for 210 minutes hours resulting in aggregates of a size of 5.7 microns and a GSD of 1.22 To this toner aggregate was added 150 grams of the above prepared latex (latex B) followed by stirring for an additional 30 minutes and the particle size was found to be 5.8 and a GSD of 1.20. The pH of the resulting mixture was then adjusted from 2.6 to 7.5 with aqueous base solution of 4 percent sodium hydroxide and allowed to stir for an additional 15 minutes. Subsequently, the resulting mixture was heated to 90° C. and retained there for a period of 1 hour where the particle size measured was 5.9 microns and a GSD of 1.20, followed by the reduction of the pH to 4.5 with 2.5 percent nitric acid solution. The resultant mixture was then allowed to coalesce for an additional 5 hrs. The morphology of the particles was spherical particles. The particle size was 6 microns with a GSD of 1.2. The reactor was then cooled down to room temperature and the particles were washed 4 times, where the first wash was conducted at pH of 11, followed by two washes with deionized water, and the last wash carried out at a pH of 4. The particles were then dried. The charge on these particles was measured to be about 0.02 to 0.15 µC/g.

EXAMPLE 9

Preparation of crosslinked emulsion aggregation particles. Following the completion of a standard preparation of an emulsion (a latex (colloidal dispersion in water) of very small seed particles made of polystyrene/butyl acrylate copolymer), the temperature is lowered to about 60° C. and the emulsion particle swollen with a solution of multifunctional acrylates and photoinitiator. The multifunctional acrylate solution consisted of 4 parts 1,6-hexanediol diacrylate (Sartomer SR 238), 4 parts trimethylolpropane triacrylate (Sartomer SR 351), 2 parts pentaerythritol tetraacrylate (Sartomer SR 295), and 0.2 parts BASF LUCIRIN TPO-L photoinitiator. This solution is added gradually to the latex, which is 90 parts solids. Following aggregation and coalescence, the suspended particles are crosslinked by circulating the suspension by a UV light source under nitrogen, in this case a Super Mix Photochemical Reaction Vessel (Model 7868 Ace Glass) equipped with an immersion well, lamp and power source. Following radiation, the particles are washed.

EXAMPLE 10

Polyester resin (SPAR II, a commercially available unsaturated polyester resin available from DOW Chemical) (90 parts) is combined with the multifunctional acrylate solution identified in the prior example in the same proportions. The mixture is then taken through the polyester emulsion aggregation process and irradiated as in Example 9.

EXAMPLE 11

Ten parts dipentaerythritol pentaacrylate (Sartomer SR 399), 90 parts Sartomer CN 959, a high viscosity (180,000 cPs) blend aliphatic urethane diacrylate and monomer diluent, 0.2 parts BASF LUCIRIN TPO-L photoinitiator and 3 parts surfactant are emulsified using a high pressure piston homogenizer. The emulsion is then used in aggregation and coalescence steps to produce particles. The particles are then crosslinked as in Example 9 above.

EXAMPLE 12

Formation of a display device with a grid pattern formed onto ITO coated glass. SU-8 cells were patterned onto ITO coated glass plates according to the following procedure:
spin on SU-8-25 (should give about a 30 micron film);
softbake on a leveled hotplate, 5 minutes at 115° C.,
expose resist with UV light (~340 nm), 3 minutes at 8 mW/cm$^2$ through a photomask;
post exposure bake on hotplate at 115° C., 5 minutes;
develop in SU-8 developer (PGMEA);
rinse with isopropanol; and
hardbake at 150° C., 5 minutes.

The display medium comprised of cyan and magenta emulsion aggregation particles of opposite charge was sandwiched between 2 such SU-8 cells, each 27 µm thick. A square wave voltage of +/−100V was applied to the two plates, and the color transition was observed as the two toners migrated back and forth between the two plates. Successful transitions were realized between the cyan and magenta states.

EXAMPLE 13

Preparation of display device with microencapsulated particles. Step 1—microencapsulation of the display fluid. A two-particle fluid mixture was encapsulated using the technique of complex coacervation, under high shear, provided with an overhead mixer equipped with a 3-blade impeller. 40 mL of a mixture of black and white particle sets was prepared, with a final solids loading of 15% (w/w) and a 1.5:1 ratio of black:white in DOW 200 5cSt silicone fluid. The encapsulation solution was prepared by mixing the following solutions (heated to 40° C.): 100 mL of a 6.6%/

(gelatin solution, 400 mL of water, and 100 mL of a 6.6% solution of gum arabic solution in warm water. Next, the pH of the encapsulation solution was adjusted to 4.5 via dropwise addition of dilute acetic acid solution. The ink mixture was poured into the encapsulation bath, and allowed to cool to room temperature. The resultant capsules were crosslinked with gluteraldehyde, washed with water, and wet-sieved to isolate the desired capsules.

Step 2—isolation and classifying of microcapsules. The capsules slurry was wet sieved through nylon filter screens with mesh sizes of 440, 300, 200, 100, and 74 μm diameter openings with vigorous shaking. The desired size cut was selected for coating on a substrate.

Step 3—coating of substrate/lamination of top layer. A first ITO/MYLAR substrate was coated with a layer of PVA (3 mils gap) on the conductive (ITO) side and was air dried for 20 hours at room temperature. Next, 6 g of wet sieved capsules (<200 μm) were separated by gravitation on a filter paper from most of the water in which they were kept. The capsules were mixed with a solution containing 0.5 g of PVA 30%, 3 drops of 1-octanol (defoamer) and 75 mg of glycerol (plasticizer for PVA). This capsule slurry was coated with a blade (gap was 10 mils) on top of the PVA layer on the first MYLAR substrate. The film was dried at room temperature for 20 hours. The capsules deformed during the dewatering process, creating a close-packed array. The film was then coated with a layer of NEOREZ (water based polyurethane glue) by using a blade and was dried for 1 hour at room temperature and for an additional hour at 50° C. A second ITO/MYLAR substrate was coated on the ITO side with NEOREZ glue with a blade (10 mils gap), then dried for 1 hour at room temperature and for 30 minutes at 50° C. The two substrates were laminated together to provide the final device, which is switchable between black and white states.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An electrophoretic display medium, comprising at least one set of colored particles in a dielectric fluid, and wherein the display medium has an electrical conductivity of about $10^{-11}$ to about $10^{-15}$ S/m.

2. The electrophoretic display medium according to claim 1, wherein the display medium has an electrical conductivity of from about $10^{-12}$ to about $10^{-13}$ S/m.

3. The electrophoretic display medium according to claim 1, wherein the at least one set of colored particles has a charge of from about ±0.1 to about ±20 μC/g.

4. The electrophoretic display medium according to claim 1, wherein the display medium is substantially free of charge control additives and ionic species.

5. The electrophoretic display medium according to claim 1, wherein the fluid comprises from about 10% to about 95% by weight of the display medium and each set of same colored particles comprises from about 5% to about 50% by weight of the display medium.

6. The electrophoretic display medium according to claim 1, wherein the fluid comprises decane epoxide, dodecane epoxide, cyclohexyl vinyl ether, naphthalene, tetrafluorodibromoethylene, tetrachloroethylene, trifluorochloroethylene, 1,2,4-trichlorobenzene, carbon tetrachloride, decane, dodecane, tetradecane, xylene, toluene, hexane, cyclohexane, benzene, an aliphatic hydrocarbon, naphtha, octamethyl cyclosiloxane, cyclic siloxanes, poly(methyl phenyl siloxane), hexamethyldisiloxane, polydimethylsiloxane, poly(chlorotrifluoroethylene) polymer, or mixtures thereof.

7. The electrophoretic display medium according to claim 1, wherein the fluid has a viscosity of about 0.25 centistokes to about 10 centistokes at about 23° C. to about 27° C.

8. The electrophoretic display medium according to claim 1, wherein the fluid includes a gelling agent therein.

9. The electrophoretic display medium according to claim 1, wherein the at least one set of colored particles comprises polyester emulsion aggregation particles, styrene-acrylate emulsion aggregation particles or acrylate emulsion aggregation particles.

10. The electrophoretic display medium according to claim 9, wherein the at least one set of particles has an average particle size of from about 0.5 to about 25 μm, an upper geometric standard deviation (GSD) by volume for (D84/D50) is in the range of from about 1.1 to about 1.25, and an average circularity of about 0.92 to about 0.99.

11. The electrophoretic display medium according to claim 9, wherein the particles have a core-shell structure in which the shell is substantially free of coloring agent.

12. The electrophoretic display medium according to claim 1, wherein the fluid and the at least one set of particles have densities that are within about 10% of each other.

13. The electrophoretic display medium according to claim 1, wherein the fluid includes two immiscible fluids having different densities such that a first immiscible fluid having a density less than that of a second immiscible fluid lies over the second immiscible fluid, and the at least one set of colored particles has a density in between the densities of the two immiscible fluids such that the particles rest at an interface between the two immiscible fluids.

14. The electrophoretic display medium according to claim 1, comprising one set of colored particles dispersed in a colored dielectric fluid.

15. The electrophoretic display medium according to claim 1, wherein the at least one set of colored particles comprises a set of black particles and a set of white particles.

16. The electrophoretic display medium according to claim 1, wherein the at least one set of colored particles comprises a set of cyan particles, a set of yellow particles, a set of magenta particles and a set of black particles.

17. The electrophoretic display medium according to claim 1, wherein the at least one set of colored particles comprises a set of red particles, a set of green particles and a set of blue particles.

18. An electrophoretic display device, comprising a multiplicity of individual reservoirs containing a display medium between conductive substrates, at least one of which is transparent, wherein the display medium comprises at least one set of colored particles in a dielectric fluid, and wherein the display medium has an electrical conductivity of about $10^{-11}$ to about $10^{-15}$ S/m.

19. The electrophoretic display device according to claim 18, wherein the display medium has an electrical conductivity of from about $10^{-12}$ to about $10^{-13}$ S/m.

20. The electrophoretic display device according to claim 18, wherein the at least one set of colored particles has a charge of from about ±0.25 to about ±10 μC/g.

21. The electrophoretic display device according to claim 18, wherein the display medium is substantially free of charge control additives and ionic species.

22. The electrophoretic display device according to claim 18, wherein the at least one set of colored particles comprises polyester emulsion aggregation particles, styrene-acrylate emulsion aggregation particles or acrylate emulsion aggregation particles.

23. The electrophoretic display device according to claim 22, wherein the at least one set of particles has an average particle size of from about 0.5 to about 25 μm, an upper geometric standard deviation (GSD) by volume for (D84/D50) is in the range of from about 1.1 to about 1.25, and an average circularity of about 0.92 to about 0.99.

* * * * *